United States Patent
Ye et al.

(10) Patent No.: US 11,496,236 B2
(45) Date of Patent: Nov. 8, 2022

(54) METHOD AND APPARATUS FOR LINK BUDGET ENHANCEMENTS IN COMMUNICATION SYSTEMS

(71) Applicant: Samsung Electronics Co., Ltd., Suwon-si (KR)

(72) Inventors: Qiaoyang Ye, San Jose, CA (US); Jeongho Jeon, San Jose, CA (US); Joonyoung Cho, Portland, OR (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/131,566

(22) Filed: Dec. 22, 2020

(65) Prior Publication Data

US 2022/0052779 A1 Feb. 17, 2022

Related U.S. Application Data

(60) Provisional application No. 63/073,115, filed on Sep. 1, 2020, provisional application No. 63/065,778, filed on Aug. 14, 2020.

(51) Int. Cl.
*H04L 1/00* (2006.01)
*H04W 72/04* (2009.01)
(Continued)

(52) U.S. Cl.
CPC .......... *H04L 1/0004* (2013.01); *H04L 1/001* (2013.01); *H04L 1/0002* (2013.01);
(Continued)

(58) Field of Classification Search
CPC ... H04L 1/1861; H04L 1/0004; H04L 1/0002; H04L 1/001; H04L 1/1816; H04L 5/0048; H04L 1/1893; H04L 5/0053; H04L 5/0091; H04L 1/0038; H04W 72/042; H04W 72/0446; H04W 72/0453; H04W 8/08; H04W 76/28; H04W 72/0493; H04W 24/08

See application file for complete search history.

(56) References Cited

U.S. PATENT DOCUMENTS

2018/0198677 A1   7/2018 Blankenship et al.
2019/0053211 A1*  2/2019 Ying ................. H04W 72/14
(Continued)

OTHER PUBLICATIONS

"3rd Generation Partnership Project; Technical Specification Group Radio Access Network; Study on New Radio (NR) to support non-terrestrial networks (Release 15)", 3GPP TR 38.811 V15.4.0, Sep. 2020, 127 pages.

(Continued)

*Primary Examiner* — Jung Liu
*Assistant Examiner* — Jung-Jen Liu

(57) ABSTRACT

A method for operating a user equipment (UE) is provided. The method comprises obtaining configuration information for one or more repetitions for one or more channels of a physical downlink control channel (PDCCH), a physical downlink shared channel (PDSCH), or a physical uplink shared channel (PUSCH), wherein the configuration information comprises a parameter to extend a maximum number of repetitions for the one or more channels; and transmitting or receiving the one or more repetitions according to the configuration information.

20 Claims, 12 Drawing Sheets

(51) Int. Cl.
*H04L 5/00* (2006.01)
*H04L 1/18* (2006.01)
(52) U.S. Cl.
CPC .......... *H04L 1/1816* (2013.01); *H04L 1/1861* (2013.01); *H04L 1/1893* (2013.01); *H04L 5/0048* (2013.01); *H04W 72/042* (2013.01); *H04W 72/0446* (2013.01); *H04W 72/0453* (2013.01)

(56) References Cited

U.S. PATENT DOCUMENTS

| | | | |
|---|---|---|---|
| 2021/0100001 A1* | 4/2021 | Höglund | H04L 5/0053 |
| 2021/0274526 A1* | 9/2021 | Shin | H04W 76/27 |
| 2021/0314033 A1* | 10/2021 | Fakoorian | H04L 1/1861 |
| 2021/0314925 A1* | 10/2021 | Shin | H04W 72/042 |
| 2021/0352690 A1* | 11/2021 | Shin | H04L 1/1896 |
| 2022/0015089 A1* | 1/2022 | Shin | H04W 52/262 |
| 2022/0039140 A1* | 2/2022 | Yi | H04L 5/0053 |
| 2022/0045806 A1* | 2/2022 | Cirik | H04W 72/042 |

OTHER PUBLICATIONS

"3rd Generation Partnership Project; Technical Specification Group Radio Access Network; Solutions for NR to support non-terrestrial networks (NTN) (Release 16)", 3GPP TR 38.821 V16.0.0, Dec. 2019, 140 pages.
"Solutions for NR to support non-terrestrial networks (NTN)", 3GPP TSG RAN meeting #86, RP-193234, Sitges, Spain, Dec. 9-13, 2019, 10 pages.
"New Study WID on NB-IoT/eTMC support for NTN", 3GPP TSG RAN Meeting #86, RP-193235, Sitges, Spain, Dec. 9-31, 2019, 4 pages.
"5G; NR; Radio Resource Control (RRC); Protocol specification (3GPP TS 38.331 version 16.2.0 Release 16)", ETSI TS 138 331 V16.2.0, Nov. 2020, 908 pages.
"5G; NR; Physical layer procedures for data (3GPP TS 38.214 version 16.3.0 Release 16)", ETSI TS 138 214 V16.3.0, Nov. 2020, 169 pages.
International Search Report and Written Opinion of the International Searching Authority in connection with International Application No. PCT/KR2021/010792 dated Nov. 23, 2021, 8 pages.
Apple Inc., "On potential techniques for PUSCH coverage enhancement", R1-2006532, 3GPP TSG RAN WG1#102, e-Meeting, Aug. 17-28, 2020, 2 pages.
Huawei et al., "Discussion on HARQ enhancement for NTN", R1-2005267, 3GPP TSG RAN WG1 Meeting #102-e, E-meeting, Aug. 17-28, 2020, 5 pages.
Moderator (OPPO), "FL summary #2 for Multi-TRP/Panel Transmission", R1-2002730, 3GPP TSG RAN WG1 #100bis, e-Meeting, Apr. 20-30, 2020, 50 pages.
3GPP TS 38.214 V16.2.0 (Jun. 2020); Technical Specification; 3rd Generation Partnership Project; Technical Specification Group Radio Access Network; NR; Physical layer procedures for data (Release 16); 163 pages.

* cited by examiner

METHOD AND APPARATUS FOR LINK BUDGET ENHANCEMENTS IN COMMUNICATION SYSTEMS

CROSS-REFERENCE TO RELATED APPLICATIONS AND CLAIM OF PRIORITY

The present application claims priority to U.S. Provisional Patent Application No. 63/065,778 filed on Aug. 14, 2020 and U.S. Provisional Patent Application No. 63/073,115 filed on Sep. 1, 2020. The content of the above-identified patent documents is incorporated herein by reference.

TECHNICAL FIELD

The present disclosure relates to electronic devices and methods on link budget enhancements, including transmissions with repetitions in wireless communication networks supporting dynamic changes of repetitions, and frequency resource allocation in unit smaller than 1 PRB for UL transmissions.

BACKGROUND

A non-terrestrial network (NTN) includes networks, or segments of networks, using an airborne or space-borne vehicle to embark a transmission equipment relay node or base station. The NTN can provide ubiquitous coverage and is less vulnerable to disasters, compared to conventional terrestrial network. There is increasing interest in support of NTN in Narrowband Internet of Things (NB-IoT), Enhanced Machine Type Communication (eMTC), long term evolution (LTE) and 5G systems. Studies have been completed regarding NTN deployment scenarios, channel models and potential impact areas on New Radio (NR) to support NTN. A basic philosophy of NR in $3^{rd}$ Generation Partnership Project (3GPP) is to support beam-specific operations for wireless communication between a gNode B (gNB) and a user equipment (UE). Due to the large distance between the satellites and UEs, link budget can be limited in NTN systems compared to conventional terrestrial networks.

SUMMARY

Embodiments of the present disclosure provide methods and apparatuses for full power UL MIMO operation in an advanced wireless communication system.

In one embodiment, a user equipment (UE) is provided. The UE includes a transceiver configured to communicate via a wireless communication medium with a base station. The UE further includes a processor configured to obtain configuration information for one or more repetitions for one or more channels of a physical downlink control channel (PDCCH), a physical downlink shared channel (PDSCH), or a physical uplink shared channel (PUSCH), wherein the configuration information comprises a parameter to extend a maximum number of repetitions for the one or more channels, and control the transceiver to transmit or receive the one or more repetitions according to the configuration information.

In another embodiment, a base station (BS) is provided. The BS includes a transceiver configured to communicate via a wireless communication medium with a user equipment (UE). The BS further includes a processor configured to transmit, via the transceiver, configuration information for one or more repetitions for one or more channels of a physical downlink control channel (PDCCH), a physical downlink shared channel (PDSCH), or a physical uplink shared channel (PUSCH), wherein the configuration information comprises a parameter to extend a maximum number of repetitions for the one or more channels, and transmit or receive, via the transceiver, the one or more repetitions according to the configuration information.

In yet another embodiment, a method is provided. The method comprises obtaining configuration information for one or more repetitions for one or more channels of a physical downlink control channel (PDCCH), a physical downlink shared channel (PDSCH), or a physical uplink shared channel (PUSCH), wherein the configuration information comprises a parameter to extend a maximum number of repetitions for the one or more channels; and transmitting or receiving the one or more repetitions according to the configuration information.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
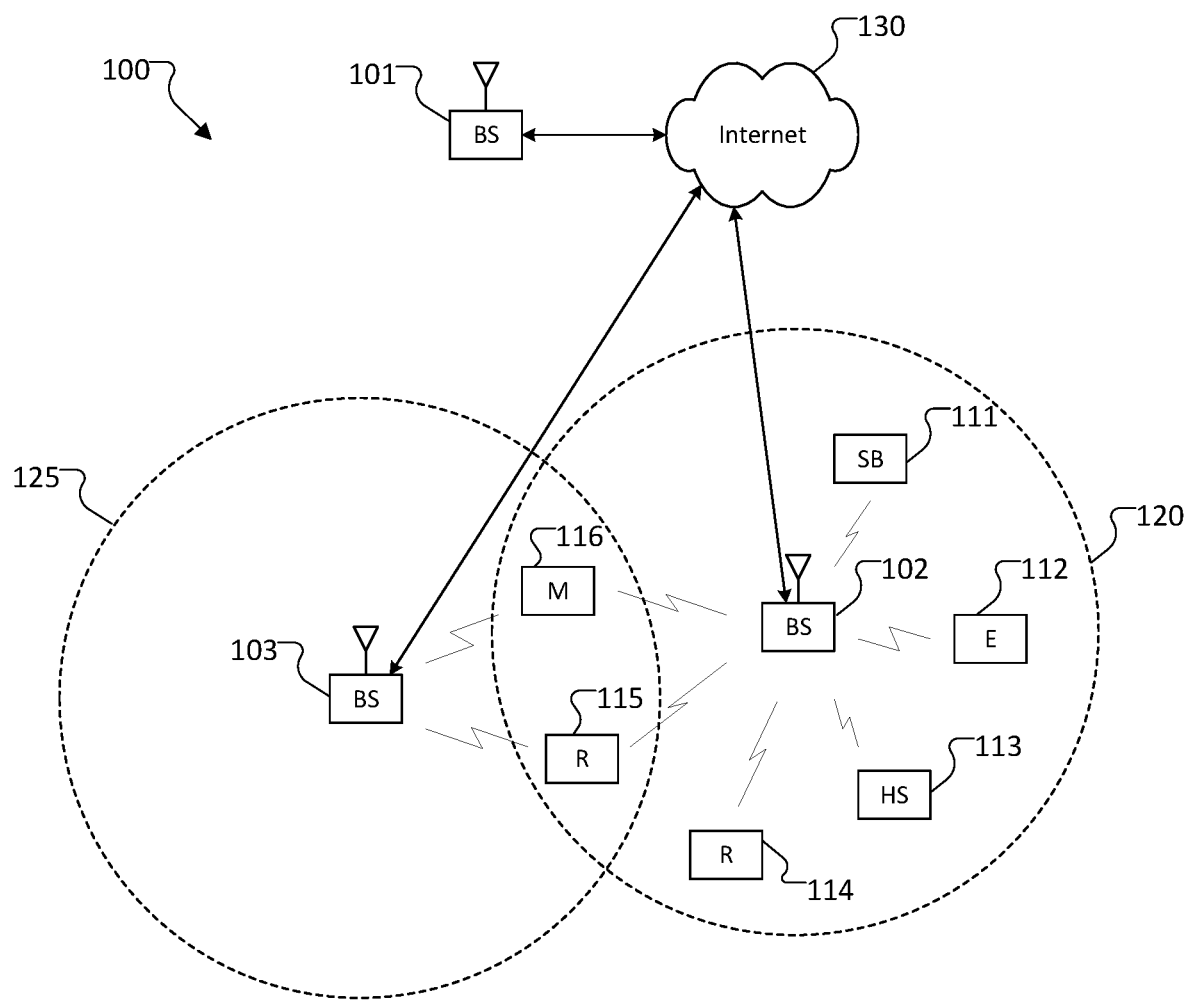
FIG. 1 illustrates an example wireless network according to embodiments of the present disclosure.

FIG. 1 through FIG. 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: (1) 3GPP, TR 38.811, Study on NR to support non-terrestrial networks; (2) 3GPP, TR 38.821, Solutions for NR to support non-terrestrial networks (NTN); (3) Solutions for NR to support non-terrestrial networks (NTN), Thales, RAN #86, December 2019; (4) New study WID on NB-IoT/eMTC support for NTN, MediaTek Inc., RAN #86, December 2019; (5) 3GPP, TS 38.331, 5G; NR; Radio Resource Control (RRC); Protocol specification; and (6) 3GPP, TS 38.214, 5G; NR; Physical layer procedures for data.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

Embodiments of the present disclosure can be applied not only to NTN systems, but also to any other wireless communication systems. The examples for NTN systems should be considered in inclusive manner, without exclusion of other wireless communication systems. For example, the disclosed methods can be applied to NR systems, e.g. with coverage enhancement.

In the following, for brevity, both Frequency Division Duplexing (FDD) and Time Division Duplexing (TDD) are considered as the duplex method for both DL and UL signaling.

Although exemplary descriptions and embodiments to follow assume orthogonal frequency division multiplexing (OFDM) or orthogonal frequency division multiple access (OFDMA), this disclosure can be extended to other OFDM-based transmission waveforms or multiple access schemes such as filtered OFDM (F-OFDM).

The present disclosure covers several components which can be used in conjunction or in combination with one another, or can operate as standalone schemes.

To meet the demand for wireless data traffic having increased since deployment of 4G communication systems, efforts have been made to develop an improved 5G or pre-5G communication system, as well as non-terrestrial networks (NTN). Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying (FSK) and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
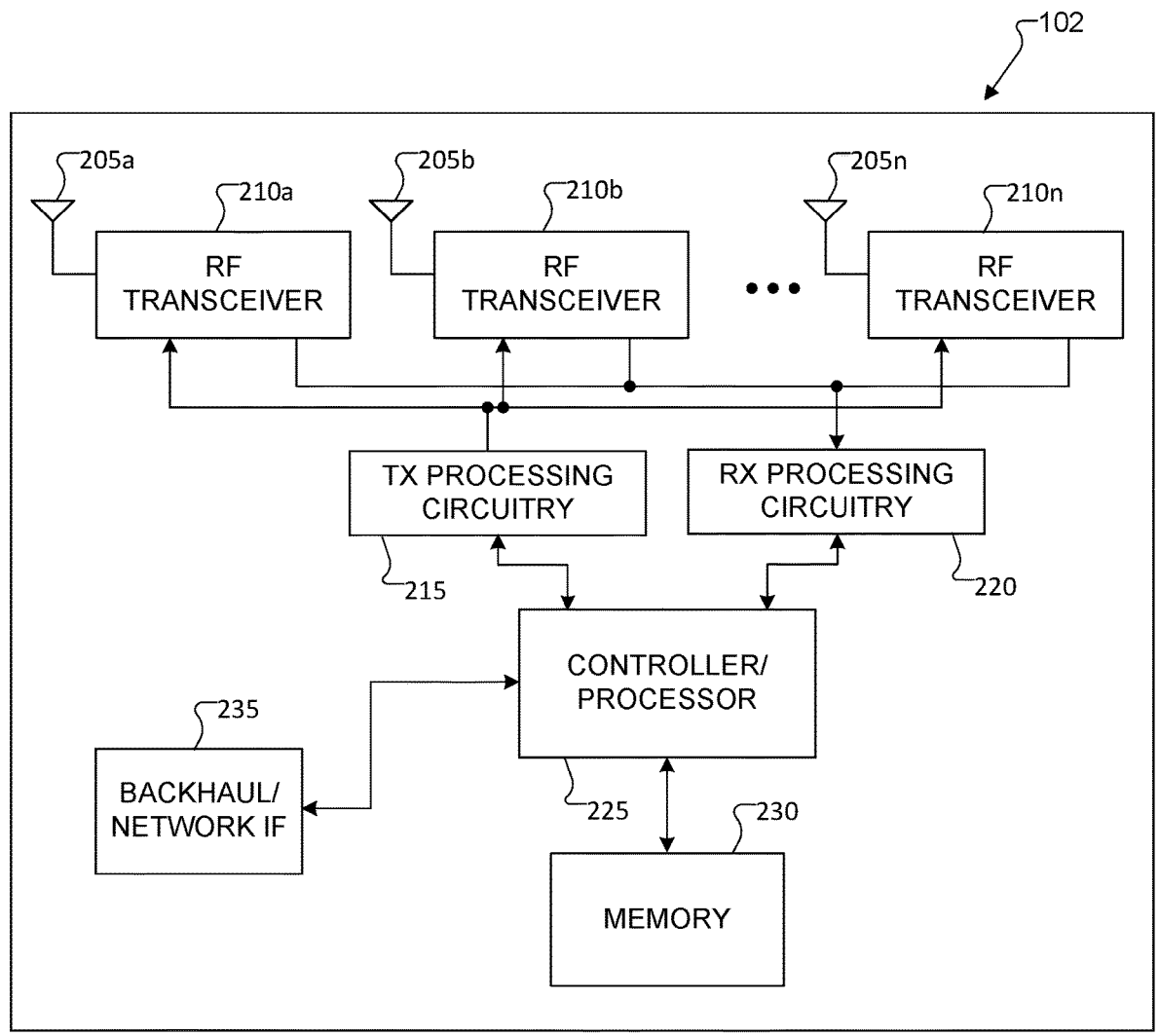
FIG. 2 illustrates an example gNB according to embodiments of the present disclosure.
Figure 3:
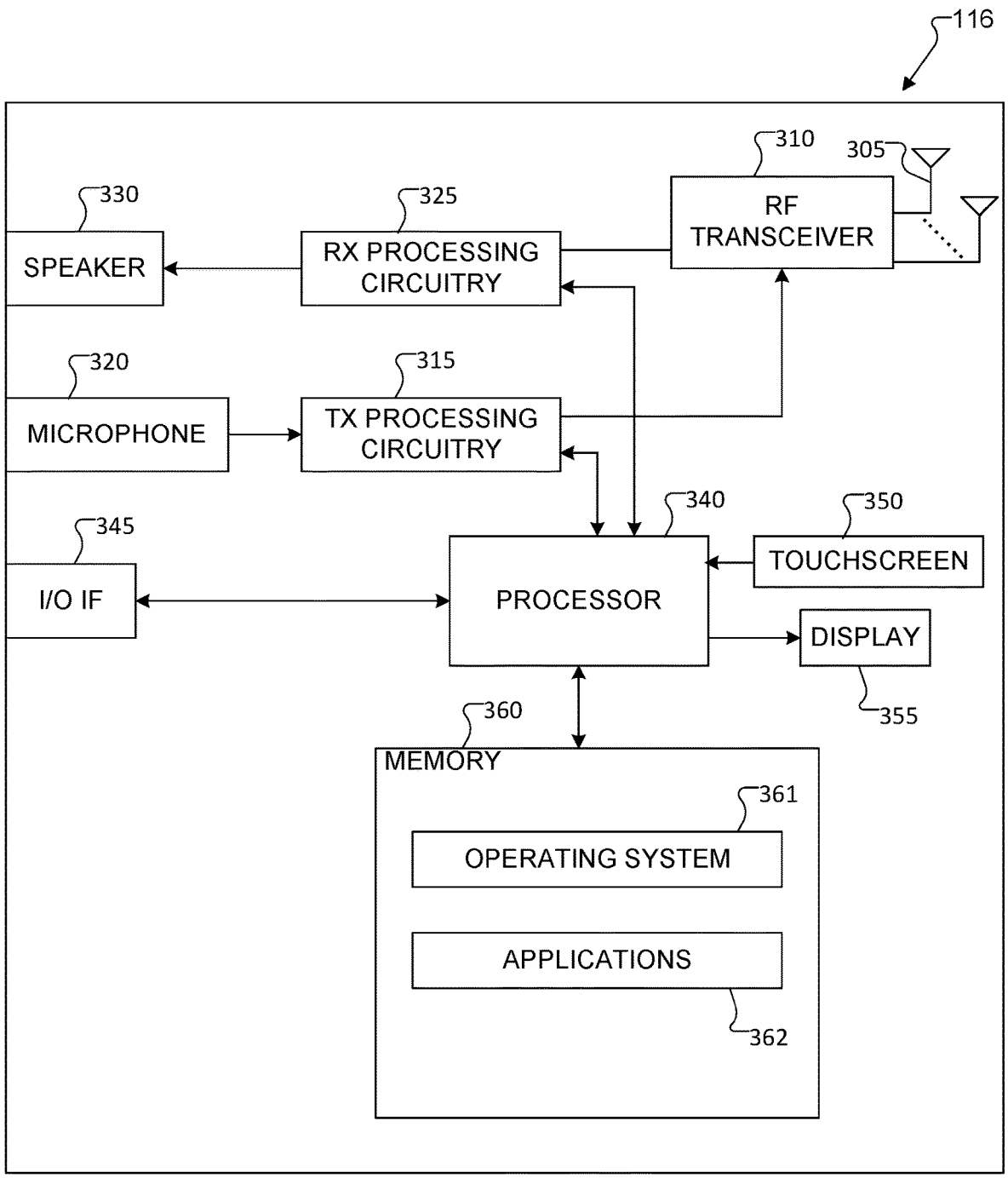
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

In new radio (NR) systems, a user equipment (UE) can be configured with pdsch-AggregationFactor in pdsch-config, where the same symbol allocation is applied across the pdsch-AggregationFactor consecutive slots for PDSCH. The UE may expect that the TB is repeated within each symbol allocation among each of the pdsch-AggregationFactor consecutive slots and the PDSCH is limited to a single transmission layer. The redundancy version (RV) to be applied on the $n^{th}$ transmission occasion of the TB, where n=0, 1, . . . pdsch-AggregationFactor-1, is determined according to table 5.1.2.1-2 [of 38.214-3GPP, TS 38.214, 5G; NR; Physical layer procedures for data], which is reproduced as TABLE 1 below, and "$rv_{id}$ indicated by the DCI scheduling the PDSCH" in table 5.1.2.1-2 [of 38.214-3GPP, TS 38.214, 5G; NR; Physical layer procedures for data] is assumed to be 0 for PDSCH scheduled without corresponding PDCCH transmission using sps-Config and activated by DCI format 1_1 or 1_2. Besides, in Rel-16 NR systems, the pdsch-TimeDomainAllocationList in IE PDSCH-config can be configured to contain repetitionNumber-r16. The DCI field "Time domain resource assignment' can indicate one entry in the pdsch-TimeDomainAllocationList containing the repetitionNumber-r16, and the PDSCH is repeated within each symbol allocation among each of the repetitionNumber-r16 consecutive slots. The RV determination is similar to the case where pdsch-AggregationFactor is configured, which is based on table 5.1.2.1-2 [of 38.214-3GPP, TS 38.214, 5G; NR; Physical layer procedures for data]

TABLE 1

APPLIED REDUNDANCY VERSION WHEN PDSCH-AGGREGATIONFACTOR IS PRESENT

| $rv_{id}$ indicated by the | $rv_{id}$ to be applied to $n^{th}$ transmission occasion | | | |
|---|---|---|---|---|
| DCI scheduling the PDSCH | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

For PUSCH, there are two types of repetitions, i.e., PUSCH repetition Type A and PUSCH repetition Type B. Whether Type A or Type B is to be used for the PUSCH repetitions is configured based on whether the higher layer parameters PUSCHRepTypeIndicator-ForType1Configuredgrant, PUSCHRepTypeIndicator-ForDCIFormat0_1, or PUSCHRepTypeIndicator-ForDCIFormat0_2 is configured and set to 'pusch-RepTypeB' or not. The number of repetitions for PUSCH can be configured by higher layer parameter pusch-AggregationFactor for PUSCH scheduled by DCI, or by higher layer parameter repK for configured grant PUSCH transmissions. For PUSCH scheduled by DCI, the redundancy version is determined similarly to the PDSCH case, which is based on Table 6.1.2.1-2 [of 38.214-3GPP, TS 38.214, 5G; NR; Physical layer procedures for data], which is reproduced as TABLE 2 below. For Type 1 or Type2 configured grant PUSCH transmission, the higher layer configured parameters repK-RV defines the redundancy version pattern to be applied to the repetitions. If the parameter repK-RV is not provided in the configuredGrantConfig, the redundancy version for each actual repetition with a configured grant shall be set to "0". Additionally, in Rel-16 NR, the pusch-TimeDomainAllocationList in IE PUSCH-config can be configured to contain numberOfRepetitions-r16. The DCI field "Time domain resource assignment' can indicate one entry in the pusch-TimeDomainAllocationList containing the numberOfRepetitions-r16, and the PUSCH is repeated repetitionNumber-r16 times based on repetition type configurations. The RV determination is similar to the case where pusch-AggregationFactor is configured, which is based on Table 2.

TABLE 2

REDUNDANCY VERSION FOR PUSCH TRANSMISSION [38.214]

| $rv_{id}$ indicated by the DCI | $rv_{id}$ to be applied to $n^{th}$ transmission occasion (repetition Type A) or $n^{th}$ actual repetition (repetition Type B) | | | |
|---|---|---|---|---|
| scheduling the PUSCH | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

Though the NR supports PDSCH and PUSCH transmissions with repetitions, the maximum value supported for parameters pdsch-AggregationFactor and pusch-AggregationFactor is "8", and the maximum value supported for parameters repetitionNumber-r16 and numberOfRepetitions-r16 is "16". For systems such as NTN case with limited link budget, larger number of repetitions is needed. Moreover, considering the dynamic changes of the channel condition, dynamic setup of repetitions for PDSCH and PUSCH transmissions are needed. In Rel-16 NR, though the number of repetitions can be indicated by DCI via indication for certain entry in the pdsch-TimeDomainAllocationList or pusch-TimeDomainAllocationList, the number of possible entries in pdsch-TimeDomainAllocationList and pusch-TimeDomainAllocationList is limited to 16 and 64, respectively. Methods that can support more flexible time domain resource allocation and number of repetitions are preferred.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of gNB 101, gNB 102 and gNB 103 include a two-dimensional (2D) antenna arrays as described in embodiments of the present disclosure. In some embodiments, one or more of gNB 101, gNB 102 and gNB 103 support the codebook design and structure for systems having 2D antenna arrays.

As described in more detail below, one or more of the UEs 111-116 and gNBs 101-103 include circuitry, programing, or a combination thereof, for supporting dynamic adjustment of number of repetitions, and for support of frequency resource allocation with granularity smaller than 1 PRB, that can be applied to scenarios with limited link budget. For example, in certain embodiments, one or more of the UEs 111-116 include circuitry, programing, or a combination thereof, for configuring one or repetitions for one or more of a physical downlink control channel (PDCCH), a physical downlink shared channel (PDSCH), or a physical uplink shared channel (PUSCH), and communicating the one or more repetitions in an advanced wireless communication system, such as a non-terrestrial network (NTN). In certain embodiments, and one or more of the gNBs 101-103 includes circuitry, programing, or a combination thereof, to facilitate configuring one or repetitions for one or more of a physical downlink control channel (PDCCH), a physical downlink shared channel (PDSCH), or a physical uplink shared channel (PUSCH), and receiving the one or more repetitions in an advanced wireless communication system, such a NTN.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. That is, the controller/processor 225 can perform a blind interference sensing (BIS) process, such as performed by a BIS algorithm, and decode the received signal subtracted by the interfering signals. Any of a wide variety of other functions can be supported in the gNB 102 by the controller/processor 225. In some embodiments, the controller/processor 225 includes at least one microprocessor or microcontroller In certain embodiments, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also capable of supporting channel quality measurement and reporting for systems having 2D antenna arrays as described in embodiments of the present disclosure. In some embodiments, the controller/processor 225 supports communications between entities, such as web RTC. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM. In certain embodiments, a plurality of instructions, such as a BIS algorithm is stored in memory 230. The plurality of instructions is configured to cause the controller/processor 225 to perform the BIS process and to decode a received signal after subtracting out at least one interfering signal determined by the BIS algorithm.

As described in more detail below, the transmit and receive paths of the gNB 102 (implemented using the RF transceivers 210a-210n, TX processing circuitry 215, and/or RX processing circuitry 220) support configuring one or more repetitions for one or more of a physical downlink control channel (PDCCH), a physical downlink shared channel (PDSCH), or a physical uplink shared channel (PUSCH), wherein a configuration information comprises a parameter to extend a maximum number of repetitions for the channel and transmitting the one or more repetitions according to the configuration information.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350 (or key pad), a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for UL transmission on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
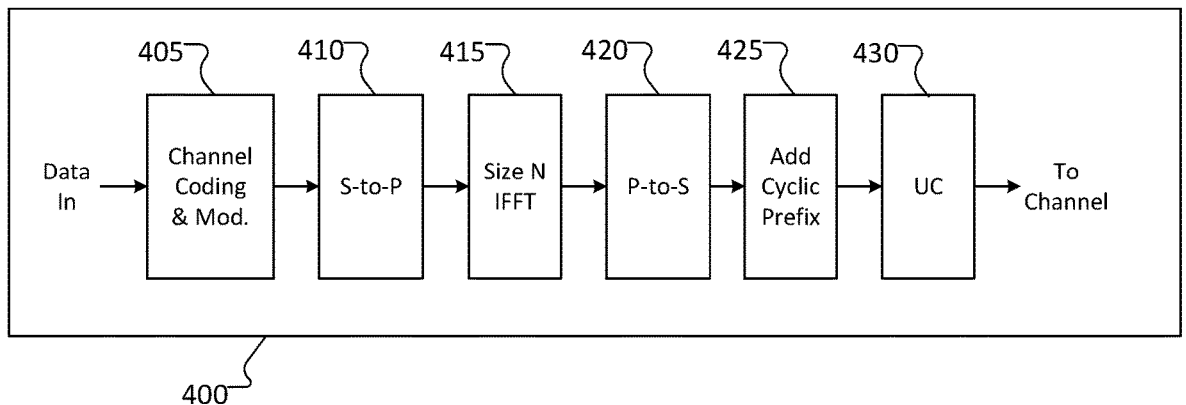
FIG. 4A illustrates a high-level diagram of an orthogonal frequency division multiple access transmit path according to embodiments of the present disclosure.
Figure 4B:
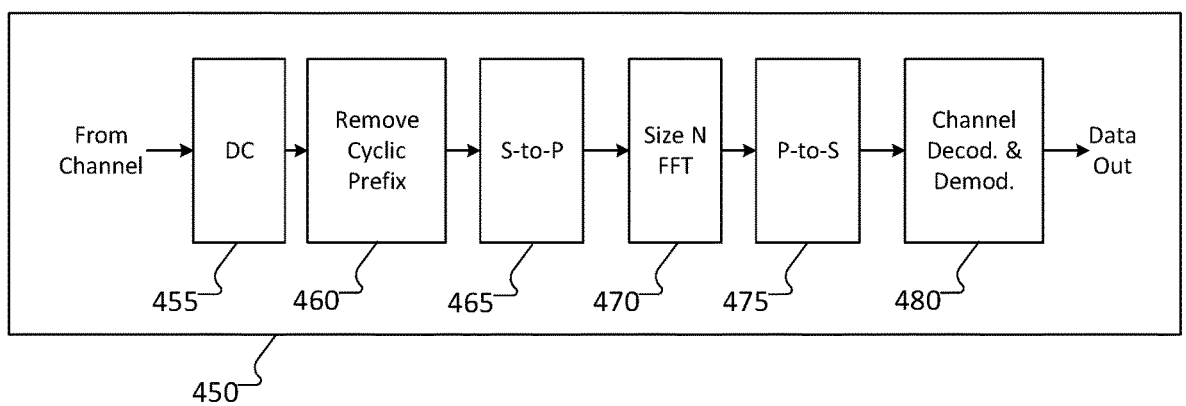
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement (ACK) information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH}=M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Embodiments of the present disclosure support of transmissions with repetitions, specifically the methods supporting dynamic adjustment of number of repetitions, and for support of frequency resource allocation with granularity smaller than 1 PRB, that can be applied to scenarios with limited link budget. The apparatus and methods can be applied not only to NTN systems, but also to any other wireless communication systems.

Figure 5:
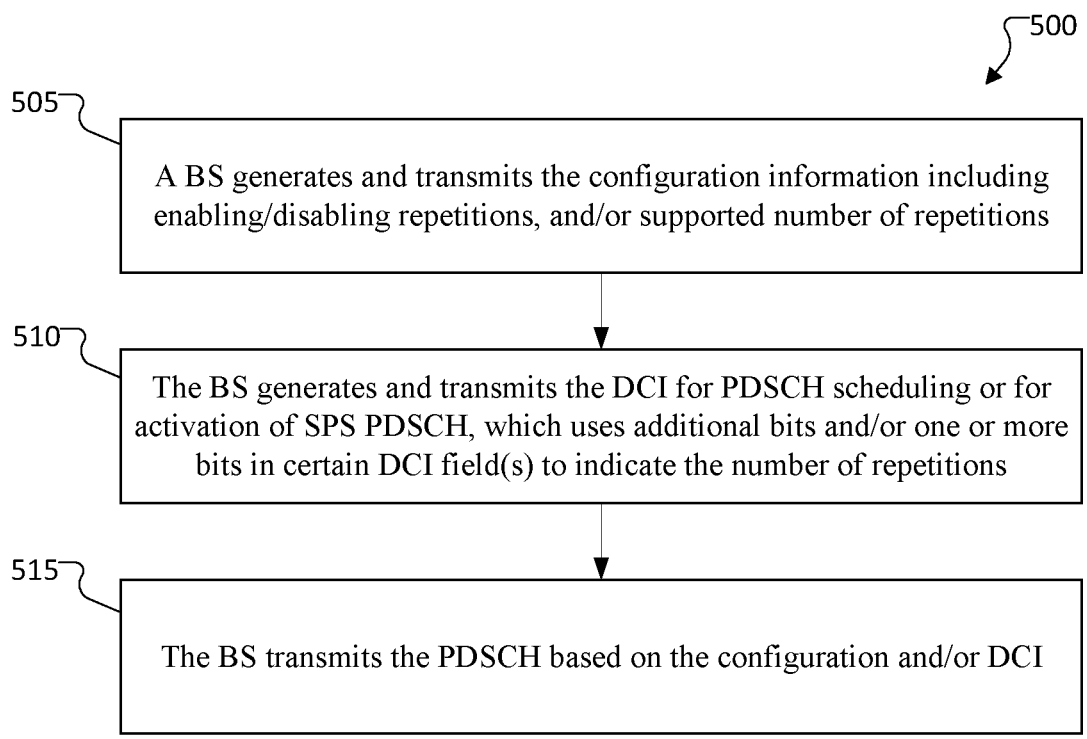
FIG. 5 illustrates a process for repetition configuration and indication for downlink transmission according to embodiments of the present disclosure.

FIG. 5 illustrates a process for repetition configuration and indication for DL transmission according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a gNB. Process 500 can be accomplished by, for example, gNB 101, 102, and 103 in network 100.

In certain embodiments, the DL and/or UL transmissions can have repetitions. Besides the PDSCH and PUSCH transmissions, the PDCCH and/or PUCCH transmissions can also be configured with repetitions. In addition, dynamic indication for number of repetitions can be supported At operation 505, gNB 102 generates and transmits configuration information for one or more UEs. In certain embodiments, the configuration information includes an indication to enable or disable a repetition feature. In certain embodiments, the configuration information includes a supported number of repetitions. The indications can be explicit or implicit. In certain embodiments, the indications are cell-specific. In certain embodiments, the indications are UE-specific. The configuration of the repetitions can be applied to PDSCH, PDCCH, or both.

At operation 510, the gNB 102 generates and transmits the DCI for scheduling of PDSCH or the DCI for DL SPS activation, where one or more additional bits, and/or one or more bits in certain DCI field(s) can be used for the indication of the number of repetitions for the PDCCH carrying the DCI or for the PDSCH. In certain embodiments, the supported maximum MCS index is configured to be limited to certain values, and one or more bits in the MCS field can be reused for the indication of the number of repetitions. In certain embodiments, the HARQ disabling is configured, and one or more bits in the PDSCH-to-HARQ feedback timing field, and/or DL assignment index indication field, and/or PUCCH resource indicator field can be reused for the indication of the number of repetitions. In certain embodiments, one or more bits in redundancy version field are reused for the indication of the number of repetitions, when the repetition is configured.

At operation 515, gNB 102 transmits the PDSCH. In certain embodiments, the PDSCH is transmitted based on the configuration. In certain embodiments, the PDSCH is transmitted based on the DCI. In certain embodiments, the PDSCH is transmitted based on both the configuration and the DCI.

Figure 6:
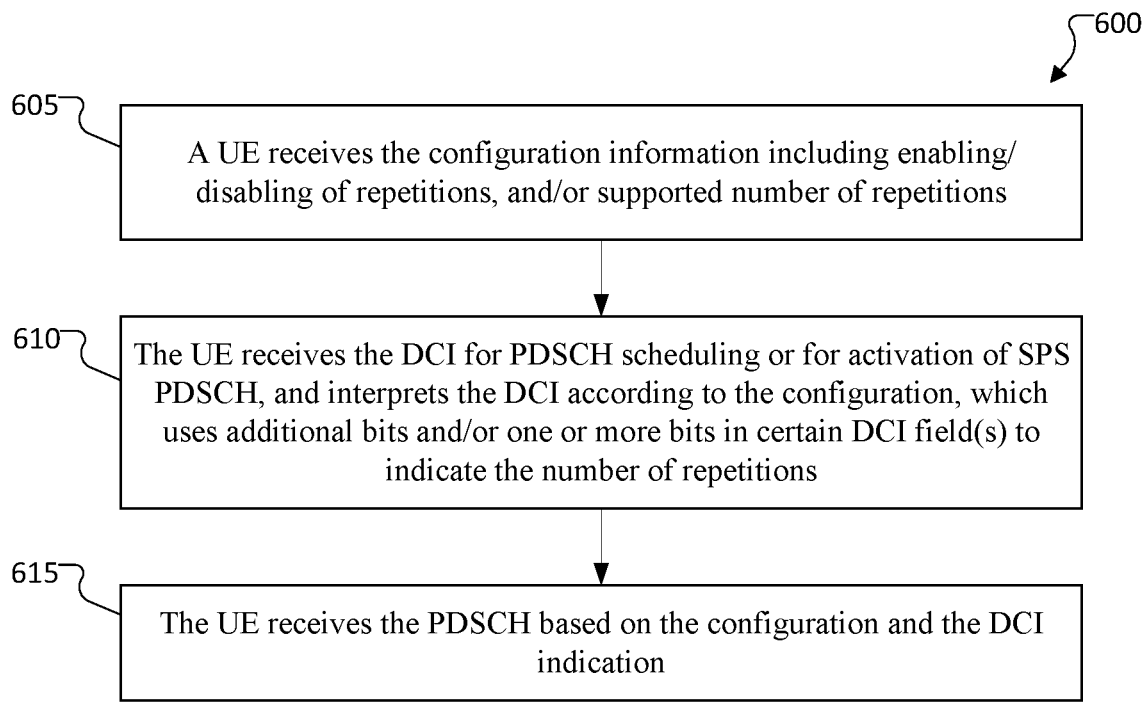
FIG. 6 illustrates a process for repetition configuration and indication for downlink reception according to embodiments of the present disclosure.

FIG. 6 illustrates a process for determination of number of repetitions for DL reception according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a UE. Process 600 can be accomplished by, for example, UE 114, 115, and 116 in network 100.

At operation 605, UE 116 receives configuration information. In certain embodiments, the configuration information includes an indication to enable or disable a repetition feature. In certain embodiments, the configuration information includes a supported number of repetitions. The indications can be explicit or implicit. In certain embodiments, the indications are cell-specific. In certain embodiments, the indications are UE-specific. The configuration of repetitions can be applied to PDSCH, PDCCH, or both.

At operation 610, the UE 116 receives the DCI for scheduling of PDSCH or the DCI for DL SPS activation, where one or more additional bits, and/or one or more bits in certain DCI field(s) can be used for the indication of the number of repetitions for the PDCCH carrying the DCI or for the PDSCH. In certain embodiments, the supported maximum MCS index can be configured to be limited to certain values, and one or more bits in the MCS field can be reused for the indication of the number of repetitions. In certain embodiments, the HARQ disabling can be configured, and one or more bits in the PDSCH-to-HARQ feedback timing field, and/or DL assignment index indication field, and/or PUCCH resource indicator field can be reused for the indication of the number of repetitions. In certain embodiments, one or more bits in redundancy version field can be reused for the indication of the number of repetitions, when the repetition is configured.

At operation 615, the UE 116 receives the PDSCH. The UE 116 receives the PDSCH based on both the configuration and the DCI indication.

In certain embodiments, the configuration for repetition for DL is explicitly indicated. Certain embodiments extend the parameter pdsch-AggregationFactor, the repetition Number, or both.

In certain embodiments, in operation 505 or operation 605, the configuration of repetitions, supported number of repetitions, or both, is explicitly indicated. In certain embodiments, the parameter pdsch-AggregationFactor in IE PDSCH-Config is extended. For example, larger values can be supported as given by TABLE 3, where nK can be any integers, such as 32, 64, 128 or 256. In another example, the meaning of the parameter pdsch-AggregationFactor can be reinterpreted, such as for certain system scenarios/modes. As one example of this embodiment, the configuration of system scenario/mode can be cell-specific, and can be configured by system information, e.g. via MIB, SIB1, other SIBs and/or a new SIB introduced for the systems. For example, one reserved bit in MIB can be used to indicate two scenarios/modes. In another example using SIB1 for this indication is illustrated in TABLE 4, in which the parameter N can be any integer. The parameter in the example below uses "NTNmode" as an example for NTN systems, while other names can be used for other systems. In certain embodiments, the parameter can be predefined that with presence of the system scenario/mode configuration information, or with certain one or more system scenario/mode being configured, the parameter pdsch-AggregationFactor can be reinterpreted, e.g. to the maximum number of repetitions for PDSCH and/or PDCCH. In certain embodiments, a mapping between the maximum number of repetitions and the set of supported number of repetitions can be predefined. For example, denoting the maximum number of repetitions by $R_{max}$, the set of supported number of repetitions can be $$\{\lceil \frac{R_{max}}{N_1} \rceil, \lceil \frac{R_{max}}{N_2} \rceil, \ldots, \lceil \frac{R_{max}}{N_L} \rceil\}$$

with [X] indicating the smallest integer that is no less than X, and which repetition number in this set to be used for the DL or UL transmission can be dynamically indicated by the DCI, e.g. the DCI to schedule the PDSCH transmission, or the DCI for activation of SPS PDSCH. The parameters $N_1$, $N_2$, ..., $N_L$ and L can be any integers, e.g., 1, 2, 4, 8, and so forth.

TABLE 3

AN EXAMPLE OF IE PDSCH-CONFIG MODIFICATION FOR CONFIGURATION OF REPETITIONS

-- ASN1 START
-- TAG-PDSCH-CONFIG-START
PDSCH-Config ::=                SEQUENCE {
   dataScramblingIdentityPDSCH  INTEGER        OPTIONAL, --
Need S                          (0 ... 1023)
   ...
   pdsch-AggregationFactor      ENUMERATED {n2, n4, n8,
                                n16, ... , nK}
OPTIONAL, -- Need S
   ...
-- TAG-PDSCH-CONFIG-STOP
-- ASN1STOP

TABLE 4

AN EXAMPLE OF IE SIB1 MODIFICATION FOR INDICATION
OF THE SYSTEM SCENARIO/MODE

```
SIB1 ::= SEQUENCE {
    cellSelectionInfo          SEQUENCE {
        q-RxLevMin             Q-RxLevMin,
        q-RxLevMinOffset       INTEGER          OPTIONAL, -- Need S
                               (1 . . . 8)
        q-RxLevMinSUL          Q-RxLevMin       OPTIONAL, -- Need R
        q-QualMin              Q-QualMin        OPTIONAL, -- Need S
        q-QualMinOffset        INTEGER          OPTIONAL -- Need S
                               (1 . . . 8)
    }                          OPTIONAL, -- Cond Standalone
    . . .
    nonCriticalExtension       SIB1-v16xy-IEs   OPTIONAL
    NTNmode                    INTEGER
OPTIONAL, -- Need S            {1 . . . N}
```

As one example, the system scenario/mode can depend on the type of airborne or space-borne vehicles that embark a transmission equipment relay node or base station. For example, a list of system scenarios/modes can be predefined, where each system scenario/mode corresponds to the airborne or space-borne vehicles at certain altitude range. TABLE 5 below provides an example of the list of system scenario/modes. As another example, less number of modes can be defined, e.g. mode 0 for Unmanned Aircraft Systems, mode 1 for LEO, mode 2 for MEO, and mode 3 for GEO.

TABLE 5

AN EXAMPLE OF PREDEFINED TABLE FOR SYSTEM MODE

| Satellite type | mode i | Altitude level $h_i$ (km) |
|---|---|---|
| Unmanned Aircraft Systems | 0 | <50 |
| LEO 300-1500 km | 1 | 300-400 |
| | 2 | 400-500 |
| | 3 | 500-600 |
| | . | . |
| | . | . |
| | . | . |
| | 11 | 1300-1400 |
| | 12 | 1400-7000 |

TABLE 5-continued

AN EXAMPLE OF PREDEFINED TABLE FOR SYSTEM MODE

| Satellite type | mode i | Altitude level $h_i$ (km) |
|---|---|---|
| MEO 7000-25000 km | 13 | 7000-8000 |
| | 14 | 8000-9000 |
| | 15 | 9000-10000 |
| | . | . |
| | . | . |
| | . | . |
| | 29 | 23000-24000 |
| | 30 | 24000-35786 |
| GEO | 31 | 35786 |

In certain embodiments, the parameter repetitionNumber in IE PDSCH-TimeDomainResourceAllocationList is extended. For example, larger values can be supported as given by TABLE 6, where nK can be any integers, such as 32, 64, 128 or 256. The postfix of the parameters in TABLE 6 should be considered in inclusive manner, while other examples can be supported as well, such as, with the postfix being changed accordingly. In one example, the parameter can be predefined such that, with presence of the system scenario/mode configuration information, or with certain one or more system scenario/mode being configured, the parameter maxNrofDL-Allocations can be extended, such as from 16 to 32, 64, 128, and so forth. In one example, the parameter maxNrofDL-Allocations can be predefined. For example, a mapping between the value of maxNrofDL-Allocations and the system scenario/mode can be predefined. Alternatively, the parameter maxNrofDL-Allocations can be configured, e.g. by higher layer signaling such as MIB, SIB1, other SIBs or UE-specific RRC signaling.

In certain embodiments, the parameter pdsch-AggregationFactor, repetitionNumber, or both are configured for PDSCH transmission only. Alternatively, the parameter can be predefined such that with presence of the system scenario/mode configuration information, or with certain one or more system scenario/mode being configured, the parameter pdsch-AggregationFactor, the repetitionNumber, or both can be applied to both PDSCH and PDCCH transmissions.

TABLE 6

AN EXAMPLE OF IE PDSCH-TIMEDOMAINRESOURCEALLOCATIONLIST
MODIFICATION FOR NUMBER OF REPETITIONS

```
ASN1START
-- TAG-PDSCH-TIMEDOMAINRESOURCEALLOCATIONLIST-START
PDSCH-TimeDomainResourceAllocationList ::= SEQUENCE (SIZE(1 . . . maxNrofDL-
Allocations)) OF PDSCH-TimeDomainResourceAllocation
PDSCH-TimeDomainResourceAllocation ::= SEQUENCE {
    k0              INTEGER(0 . . . 32)         OPTIONAL, -- Need S
    mappingType     ENUMERATED {typeA, typeB},
    startSymbolAndLength         INTEGER (0 . . . 127)
}
PDSCH-TimeDomainResourceAllocationList-r16 ::= SEQUENCE (SIZE(1 . . . maxNrofDL-
Allocations)) OF PDSCH-TimeDomainResourceAllocation-r16
PDSCH-TimeDomainResourceAllocation-r16 ::= SEQUENCE {
    k0-r16          INTEGER(0 . . . 32)         OPTIONAL, -- Need S
    mappingType-r16    ENUMERATED {typeA, typeB},
    startSymbolAndLength-r16        INTEGER (0..127),
    repetitionNumber-r16     ENUMERATED {n2, n3, n4, n5, n6, n7, n8, n16, . . . , nK }
OPTIONAL, -- Cond Formats1-0and1-1
    . . .
}
```

TABLE 6-continued

AN EXAMPLE OF IE PDSCH-TIMEDOMAINRESOURCEALLOCATIONLIST
MODIFICATION FOR NUMBER OF REPETITIONS

-- TAG-PDSCH-TIMEDOMAINRESOURCEALLOCATIONLIST-STOP
-- ASN1STOP

Certain embodiments provide for new configuration parameters. In certain embodiments, a new configuration parameter is introduced for repetitions of DL transmissions. The new configuration parameters override the configuration based on the parameter pdsch-AggregationFactor and/or repetitionNumber. That is, UE 116 is able to ignore the configuration related to the parameter pdsch-AggregationFactor and/or repetitionNumber, if the new configuration parameter is present. In certain embodiments, the configuration of repetitions is cell-specific, and is configured by system information, e.g. MIB, SIB1, other SIBs, a new SIB, or a combination thereof. For example, when using SIB1 for the explicit indication, the IEs BWP-DownlinkCommon, DownlinkConfigCommonSIB, or servingCellConfigCommonSIB in SIB1 can be modified. In this example, the IEs PDCCH-ConfigCommon and PDSCH-ConfigCommon in IE BWP-DownlinkCommon are modified for PDCCH and PDSCH configurations, respectively. The parameters r1, r2, ..., rK, rN can be any integers such as 1, 2, 4, 8, 16, ..., 64, 128, 256, and so forth, and the condition tag 'Cond NTN' refers to the NTN cases. The condition tag 'Cond NTN' throughout this disclosure is given as examples, and should be considered in an inclusive manner. For other systems, the condition tag can be changed accordingly. In the given example, different configurations of repetitions for PDCCH and PDSCH can be indicated, while in some other examples the configurations of repetitions for PDCCH and PDSCH can be jointly configured, for example, sharing the same value and being indicated in IE BWP-DownlinkCommon. In certain embodiments, the configuration of repetitions for PDSCH and PUSCH are different. In certain embodiments, the repetitions for PDSCH and PUSCH are jointly configured, for example, being indicated in IE servingCellConfigCommonSIB in SIB1, or other system information.

TABLE 7

AN EXAMPLE OF IE PDSCH-CONFIGCOMMON MODIFICATION FOR
CONFIGURATION OF REPETITIONS

-- ASN1START
-- TAG-PDCCH-CONFIGCOMMON-START
PDCCH-ConfigCommon ::=      SEQUENCE {
  controlResourceSetZero    ControlResourceSetZero      OPTIONAL, -- Cond
InitialBWP-Only ...,
  [[
  firstPDCCH-MonitoringOccasionOfPO CHOICE {
    sCS15KHZoneT                          SEQUENCE (SIZE (1 ... maxPO-perPF)) OF
INTEGER (0 ... 139),
    sCS30KHZoneT-SCS15KHZhalfT            SEQUENCE (SIZE (1 ... maxPO-perPF))
OF INTEGER (0 ... 279),
    sCS60KHZoneT-SCS30KHZhalfT-SCS15KHZquarterT          SEQUENCE (SIZE
(1 ... maxPO-perPF)) OF INTEGER (0 ... 559),
    sCS120KHZoneT-SCS60KHZhalfT-SCS30KHZquarterT-SCS15KHZoneEighthT
SEQUENCE (SIZE (1 ... maxPO-perPF)) OF INTEGER (0 ... 1119),
    sCS120KHZhalfT-SCS60KHZquarterT-SCS30KHZoneEighthT-SCS15KHZoneSixteenthT
SEQUENCE (SIZE (1 ... maxPO-perPF)) OF INTEGER (0 ... 2239),
    sCS120KHZquarterT-SCS60KHZoneEighthT-SCS30KHZoneSixteenthT              SEQUENCE
(SIZE (1 ... maxPO-perPF)) OF INTEGER (0 ... 4479),
    sCS120KHZoneEighthT-SCS60KHZoneSixteenthT             SEQUENCE (SIZE
(1 ... maxPO-perPF)) OF INTEGER (0 ... 8959),
    sCS120KHZoneSixteenthT                SEQUENCE (SIZE (1..maxPO-perPF)) OF
INTEGER (0 ... 17919)
  }                                       OPTIONAL -- Cond OtherBWP
  ]]
  pdcch-maxNumRepetition    ENUMERATED {r1, r2, .., rK}
OPTIONAL, -- Cond NTN
}
-- TAG-PDCCH-CONFIGCOMMON-STOP
-- ASN1STOP

TABLE 8

AN EXAMPLE OF IE PDSCH-CONFIGCOMMON MODIFICATION FOR
CONFIGURATION OF REPETITIONS

```
-- ASN1START
-- TAG-PDSCH-CONFIGCOMMON-START
PDSCH-ConfigCommon ::=        SEQUENCE {
    pdsch-TimeDomainAllocationList        PDSCH-TimeDomainResourceAllocationList
OPTIONAL, -- Need R
    pdsch-maxNumRepetition        ENUMERATED {r1, r2, . . . , rN}
OPTIONAL, -- Cond NTN
    . . .
}
-- TAG-PDSCH-CONFIGCOMMON-STOP
-- ASN1STOP
```

As another example of explicit indication, the configuration of repetitions can be UE-specific, and can be configured by UE-specific RRC signaling. An example of the configuration can be as follows, where the IE PDSCH-ServingCell-Config is modified.

the configuration of repetitions is applied to both dynamically scheduled PDSCH and SPS PDSCH. In another example of this embodiment, different configurations of repetitions can be set for dynamically scheduled PDSCH and SPS PDSCH. In this example, two parameters would be

TABLE 9

AN EXAMPLE OF IE PDSCH-SERVINGCELLCONFIG MODIFICATION FOR
CONFIGURATION OF REPETITIONS

```
PDSCH-ServingCellConfig ::=        SEQUENCE {
    codeBlockGroupTransmission        SetupRelease { PDSCH-CodeBlockGroupTransmission }
OPTIONAL, -- Need M
    xOverhead        ENUMERATED { xOh6, xOh12, xOh18 }        OPTIONAL, -- Need
S
    . . . ,
    [[
    maxMIMO-Layers        INTEGER (1 . . . 8)        OPTIONAL, --Need M
    processingType2Enabled        BOOLEAN        OPTIONAL -- Need M
    ]],
    [[
    pdsch-CodeBlockGroupTransmissionList-r16 SetupRelease { PDSCH-
CodeBlockGroupTransmissionList-r16 } OPTIONAL -- Need M
    ]]
    pdsch-maxNumRepetition        ENUMERATED {r1, r2, . . . , rN}
OPTIONAL, -- Cond NTN
}
```

In the above example, the configuration of repetitions is applied to all UE's BWPs of one serving cell. Alternatively, the configuration of repetitions can be configured as UE-specific value of a BWP, via IE PDSCH-Config in IE BWP-DownlinkDedicated. In one example, the configured number of repetitions can be BWP specific.

indicated in the above configuration methods, e.g. "sps-pdsch-maxNumReption" can be added to above IEs to indicate configuration of repetitions for SPS PDSCH, while the parameter given in the above IEs e.g. "pdsch-maxNum-Reption" can indicate the configuration of repetitions for a dynamically scheduled PDSCH. It is noted that the name of

TABLE 10

AN EXAMPLE OF IE PDSCH-CONFIG MODIFICATION FOR
CONFIGURATION OF REPETITIONS

```
PDSCH-Config ::=        SEQUENCE {
    dataScramblingIdentityPDSCH        INTEGER (0 . . . 1023)        OPTIONAL, --
Need S
    . . .
    pdsch-TimeDomainAllocationList-v16xy        SetupRelease { PDSCH-
TimeDomainResourceAllocationList-v16xy }        OPTIONAL, -- Need M
    repetitionSchemeConfig-r16        SetupRelease { RepetitionSchemeConfig-r16}
OPTIONAL -- Need M
    ]]
    pdsch-maxNumRepetition        ENUMERATED {r1, r2, . . . , rN}
OPTIONAL, -- Cond NTN
}
```

In certain embodiments, the above configuration methods can be applied to both the dynamically scheduled PDSCH and the SPS PDSCH. In one example of this embodiment, these parameters are just examples, and other names can also be used. Alternatively, the above methods are applied to the dynamically scheduled PDSCH only, while the following methods can be applied to the SPS PDSCH for configuration of repetitions. The configuration of repetitions for SPS PDSCH can be explicitly indicated in UE-specific RRC signaling, e.g. in IE SPS-Config. The parameters r1, r2, . . . , rN can be any integers.

TABLE 11

AN EXAMPLE OF IE SPS-CONFIG MODIFICATION FOR INDICATION OF MAXIMUM TBS FOR SPS PDSCH

```
-- ASN1START
-- TAG-SPS-CONFIG-START
SPS-Config ::=      SEQUENCE {
    periodicity      ENUMERATED {ms10, ms20, ms32, ms40, ms64, ms80, ms128, ms160,
ms320, ms640,
                spare6, spare5, spare4, spare3, spare2, spare1 },
    nrofHARQ-Processes    INTEGER (1 . . . 8),
    n1PUCCH-AN        PUCCH-ResourceId              OPTIONAL, -- Need M
    mcs-Table    ENUMERATED { qam64LowSE}                OPTIONAL, -- Need S
    . . . ,
    [[
    sps-ConfigIndex-r16     SPS-ConfigIndex-r16           OPTIONAL, -- Need N
    harq-ProcID-Offset-r16      INTEGER (0 . . . 15)      OPTIONAL, -- Need N
    periodicityExt-r16      INTEGER (1 . . . 5120)        OPTIONAL, -- Need N
    harq-CodebookID-r16     INTEGER (1 . . . 2)           OPTIONAL -- Need N
    ]]
    sps-pdsch-maxNumRepetition ENUMERATED {r1, r2, . . . , rN}
OPTIONAL, -- Cond NTN
}
-- TAG-SPS-CONFIG-STOP
-- ASN1STOP
```

Regarding the configuration parameters in Approach 1b, in one example, the maximum number of repetitions can be used, e.g. "pdcch-maxNumRepetition" and "pdsch-maxNumRepetition" for PDCCH and PDSCH, respectively, as illustrated in TABLE 7-TABLE 11. A mapping between the maximum number of repetitions and the set of supported number of repetitions can be predefined. For example, denoting the maximum number of repetitions by $R_{max}$, the set of supported number of repetitions can be $$\left\{ \left\lceil \frac{R_{max}}{N_1} \right\rceil, \left\lceil \frac{R_{max}}{N_2} \right\rceil, \ldots, \left\lceil \frac{R_{max}}{N_L} \right\rceil \right\}$$

with [X] indicating the smallest integer that is no less than X, and which one repetition number in this set to be used for the DL transmission can be dynamically indicated by the DCI, e.g. the DCI to schedule the PDSCH, or the DCI for activation of SPS PDSCH. The parameters $N_1, N_2, \ldots, N_L$ and L can be any integers, e.g., 1, 2, 4, 8, and so forth. In another example, the set of supported repetitions can be directly indicated in the above configuration methods, for example, TABLE 7-TABLE 11.

Certain embodiments provide an implicit indication for configuration of repetitions for DL. In certain embodiments of operation 505 and operation 605, the configuration of repetitions is implicit. For example, a mapping between the configuration of repetitions and the system scenarios/modes can be predefined. Once the system scenario/mode is indicated, the configuration of repetitions can be determined accordingly, e.g. $R_{max-N}$ for system scenario/mode N, where N is an index such as 1, 2, and so forth. In one example of this embodiment, the configuration of system scenario/mode can be cell-specific, and can be configured by system information, e.g. via MIB, SIB1, other SIBS, a new SIB introduced for the systems, or a combination thereof. One example for the configuration of system scenario/mode is given by TABLE 4. In one example, the mapping between the configuration of repetitions and the system scenarios/modes can be the same for dynamically scheduled PDSCH and SPS PDSCH. Alternatively, different mappings between the configuration of repetitions and the system scenarios/modes can be predefined for dynamically scheduled PDSCH and SPS PDSCH. For example, this example can be applied for configuration of repetitions for dynamically scheduled PDSCH, while the configuration of repetition for SPS PDSCH can be configured separately, or vice versa.

In one example, the repetitions for PDCCH and PDSCH can be jointly configured, for example, sharing the same value and being indicated in IEs such as BWP-DownlinkDedicated or the examples given above. In another example, different configurations of repetitions for PDCCH and PDSCH can be used. For example, the IEs such as "PDCCH-ServingCellConfig" and "PDCCH-Confg" can be modified to include the configuration information for repetitions of PDCCH.

Figure 7:
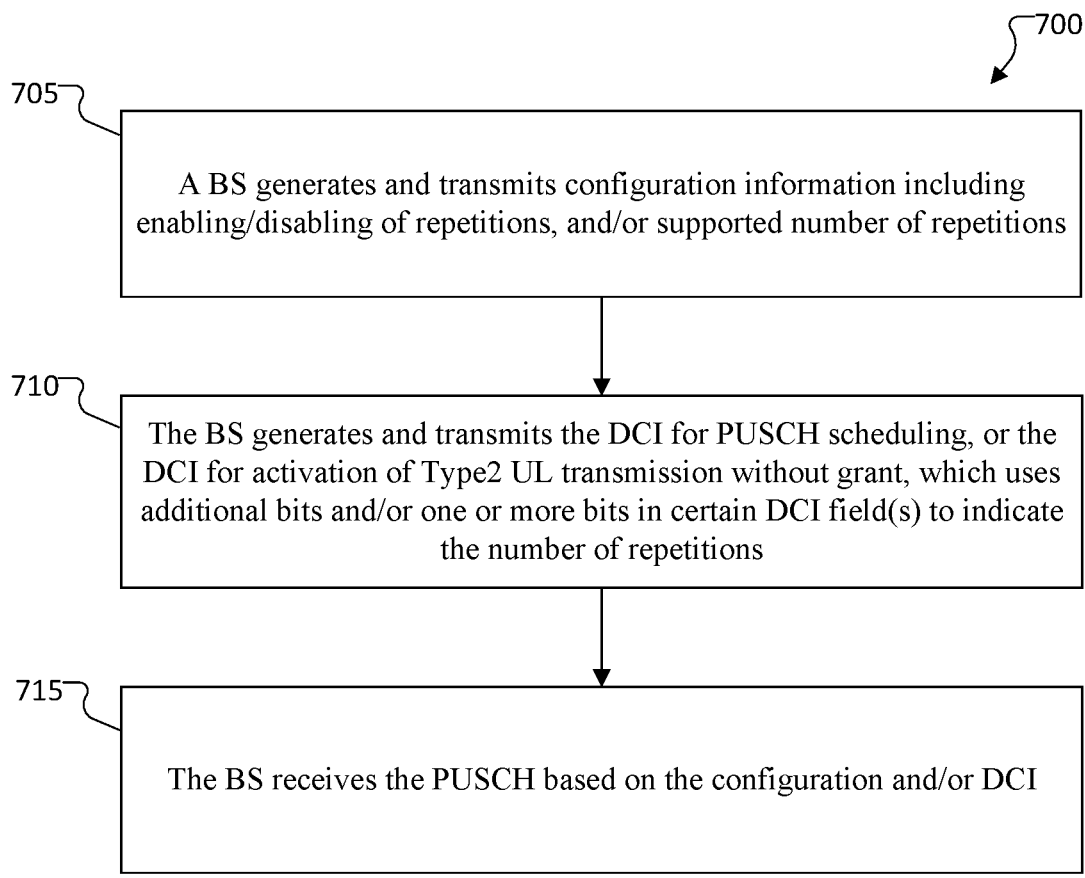
FIG. 7 illustrates a process for repetition configuration and indication for uplink reception according to embodiments of the present disclosure.

FIG. 7 illustrates a process for reception configuration and indication for UL reception according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a gNB. Process 700 can be accomplished by, for example, gNB 101, 102, and 103 in network 100.

At operation 705, gNB 102 generates and transmits configuration information. In certain embodiments, the configuration information includes an indication to enable or disable a repetition feature. In certain embodiments, the configuration information includes a supported number of repetitions. The indications can be explicit or implicit. In certain embodiments, the indications are cell-specific. In certain embodiments, the indications are UE-specific.

At operation 710, gNB 102 generates and transmits the DCI for scheduling of PUSCH or the DCI for activation of Type2 UL transmission without grant, where one or more additional bits, or one or more bits in certain DCI field(s) can be used for the indication of the number of repetitions for the PDCCH carrying the DCI or the PUSCH. In certain embodiments, the supported maximum MCS index can be configured to be limited to certain number, and one or more bits in the MCS field can be reused for the indication of the number of repetitions. In certain embodiments, one or more bits in redundancy version field can be reused for the indication of the number of repetitions, when the repetition is configured.

At operation 715, gNB 102 receives the PUSCH. The UE 116 receives the PUSCH based on the configuration, the DCI, or both.

Figure 8:
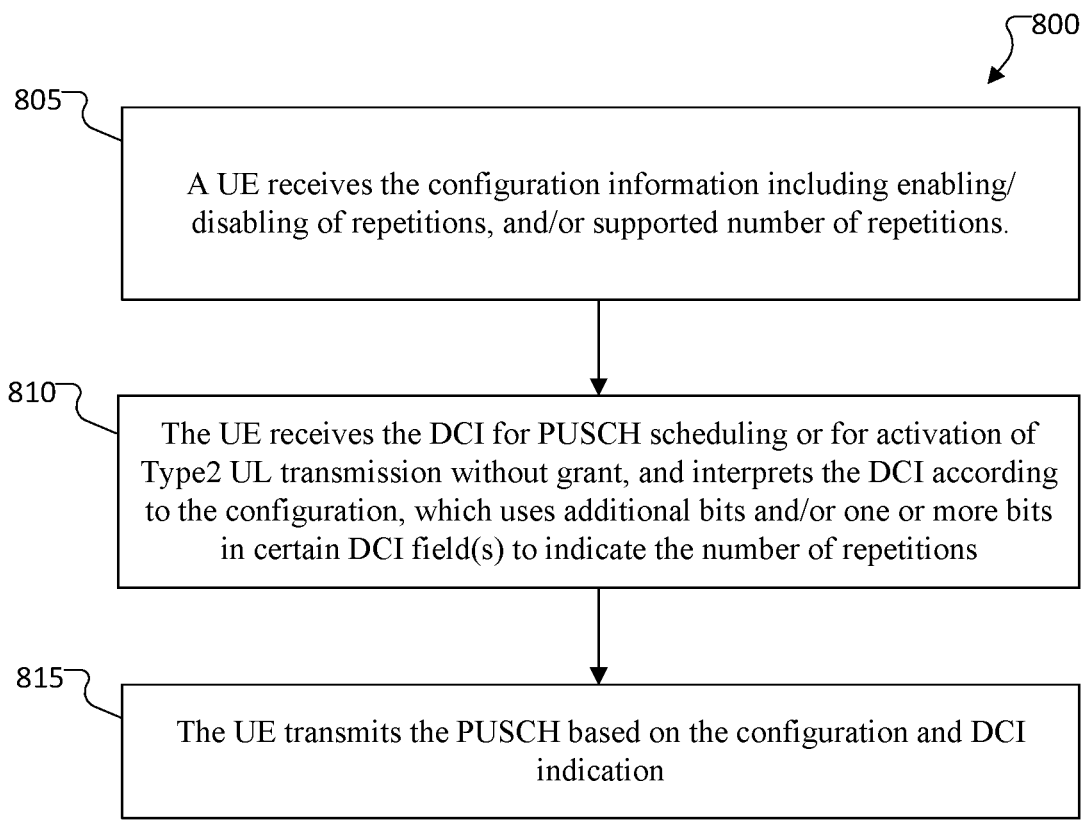
FIG. 8 illustrates a process for repetition configuration and indication for uplink transmission according to embodiments of the present disclosure.

FIG. 8 illustrates a process for repetition configuration and indication for UL transmission according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a UE. Process 800 can be accomplished by, for example, UE 114, 115, and 116 in network 100.

At operation 805, UE 116 receives configuration information. In certain embodiments, the configuration information includes an indication to enable or disable a repetition feature. In certain embodiments, the configuration information includes a supported number of repetitions. The indications can be explicit or implicit. In certain embodiments, the indications are cell-specific. In certain embodiments, the indications are UE-specific.

At operation 810, the UE 116 receives the DCI for scheduling of PUSCH or the DCI for activation of Type2 UL transmission without grant, where one or more additional bits, or one or more bits in certain DCI field(s) can be used for the indication of the number of repetitions for the PDCCH carrying the DCI or the PUSCH. In certain embodiments, the supported maximum MCS index can be configured to be limited to certain number, and one or more bits in the MCS field can be reused for the indication of the number of repetitions. In certain embodiments, one or more bits in redundancy version field can be reused for the indication of the number of repetitions, when the repetition is configured.

At operation 615, the UE 116 transmits the PUSCH. The UE 116 transmits the PDSCH based on both the configuration and the DCI indication.

For the configuration of repetitions for PUSCH, in one example, the repetitions for PDSCH and PUSCH can be jointly configured, e.g. being indicated in IE servingCellConfigCommonSIB in SIB1, or other system information. Also, the above configuration methods, for example, TABLE 7-TABLE 11 can be used, to jointly indicate the configurations of repetitions for PDSCH and PUSCH in this example. Alternatively, the configuration of repetitions for PDSCH and PUSCH can be different. Some examples of the configuration methods for repetitions for PUSCH are disclosed below.

In certain embodiments, an explicit indication for configuration of repetitions for UL is provides. Certain embodiments extend the parameter pusch-AggregationFactor, and/or repK and/or numberOfRepetitions.

In certain embodiments, in operations 705 and 805, the indication method of configuration of repetitions and/or supported number of repetitions can be explicit. In one example, the parameter pusch-AggregationFactor in IE PUSCH-Config and/or the parameter repK in IE ConfiguredGrantConfig can be extended. For example, larger values can be supported as given by TABLE 12 and TABLE 13, where nK can be any integers, e.g. 32, 64, 128 or 256. In another example, the meaning of the parameter pusch-AggregationFactor and/or repK can be reinterpreted, such as for certain system scenarios/modes. As one example of this embodiment, the configuration of system scenario or mode can be cell-specific, and can be configured by system information, e.g. via MIB, SIB1, other SIBs and/or a new SIB introduced for the systems. For example, one reserved bit in MIB can be used to indicate two scenarios or modes. Another example of using SIB1 for this indication is illustrated below in TABLE 4, where the parameter N can be any integer. The parameter in the example uses "NTNmode" as an example for NTN systems, while other names can be used for other systems. The parameter can be predefined that with presence of the system scenario or mode configuration information, or with certain one or more system scenario or mode being configured, the parameter pusch-AggregationFactor and/or repK can be reinterpreted, for example, to the maximum number of repetitions for PUSCH dynamically scheduled by DCI or for Type2 UL transmission without dynamic grant. In one example, a mapping between the maximum number of repetitions and the set of supported number of repetitions can be predefined. For example, denoting the maximum number of repetitions by $R_{max}$, the set of supported number of repetitions can be $$\{\lceil \frac{R_{max}}{N_1} \rceil, \lceil \frac{R_{max}}{N_2} \rceil, \ldots, \lceil \frac{R_{max}}{N_L} \rceil\}$$

with [X] indicating the smallest integer that is no less than X, and which one repetition number in this set to be used for the UL transmission can be dynamically indicated by the DCI, for example, the DCI to schedule the PUSCH transmission, or the DCI for activation of Type2 UL transmission without dynamic grant. The parameters $N_1, N_2, \ldots, N_L$ and L can be any integers, e.g., 1, 2, 4, 8, and so forth.

TABLE 12

AN EXAMPLE OF IE PUSCH-CONFIG MODIFICATION FOR CONFIGURATION OF REPETITIONS

-- ASN1START
-- TAG-PUSCH-CONFIG-START
PUSCH-Config ::=    SEQUENCE {
    dataScramblingIdentityPUSCH    INTEGER (0 ... 1023)    OPTIONAL, -- Need S
    ...
    pusch-AggregationFactor    ENUMERATED { n2, n4, n8, n16, ... , nK }    OPTIONAL, -- Need S
    ...

TABLE 12-continued

AN EXAMPLE OF IE PUSCH-CONFIG MODIFICATION FOR
CONFIGURATION OF REPETITIONS

```
frequencyHoppingForDCI-Format0-2-r16      CHOICE {
   pusch-RepTypeA      ENUMERATED {intraSlot, interSlot},
   pusch-RepTypeB      ENUMERATED {interRepetition, interSlot}
}                     OPTIONAL, -- Need S
...
    pusch-RepTypeIndicatorForDCI-Format0-2-r16      ENUMERATED { pusch-RepTypeA,
pusch-RepTypeB } OPTIONAL, -- Need R
    ...
    pusch-RepTypeIndicatorForDCI-Format0-1-r16      ENUMERATED { pusch-RepTypeA,
pusch-RepTypeB } OPTIONAL, -- Need R
    frequencyHoppingForDCI-Format0-1-r16      ENUMERATED {interRepetition, interSlot}
OPTIONAL, -- Cond RepTypeB
   ...
}
...
-- TAG-PUSCH-CONFIG-STOP
-- ASN1STOP
```

TABLE 13

AN EXAMPLE OF IE CONFIGUREDGRANTCONFIG MODIFICATION FOR
CONFIGURATION OF REPETITIONS

```
- ASN1START
-- TAG-CONFIGUREDGRANTCONFIG-START
ConfiguredGrantConfig ::=      SEQUENCE {
   frequencyHopping     ENUMERATED {intraSlot, interSlot}      OPTIONAL, --
Need S
   ...
OPTIONAL, -- Need S
   nrofHARQ-Processes      INTEGER(1 . . . 16),
   repK        ENUMERATED {n1, n2, n4, n8, n16, . . . , nK },
   repK-RV         ENUMERATED {s1-0231, s2-0303, s3-0000}      OPTIONAL, --
Need R
   periodicity      ENUMERATED {
           sym2, sym7, sym1×14, sym2×14, sym4×14, sym5×14, sym8×14, sym10×14,
sym16×14, sym20×14,
           sym32×14, sym40×14, sym64×14, sym80×14, sym128×14, sym160×14,
sym256×14, sym320×14, sym512×14,
           sym640×14, sym1024×14, sym1280×14, sym2560×14, sym5120×14,
           sym6, sym1×12, sym2×12, sym4×12, sym5×12, sym8×12, sym10×12,
sym16×12, sym20×12, sym32×12,
           sym40×12, sym64×12, sym80×12, sym128×12, sym160×12, sym256×12,
sym320×12, sym512×12, sym640×12,
           sym1280×12, sym2560×12
},
...
}
```

TABLE 14

AN EXAMPLE OF IE PUSCH-TIMEDOMAINRESOURCEALLOCATIONLIST
MODIFICATION FOR NUMBER OF REPETITIONS

```
-- ASN1START
-- TAG-PUSCH-TIMEDOMAINRESOURCEALLOCATIONLIST-START
PUSCH-TimeDomainResourceAllocationList ::= SEQUENCE (SIZE(1 . . . maxNrofUL-
Allocations)) OF PUSCH-TimeDomainResourceAllocation
PUSCH-TimeDomainResourceAllocation ::= SEQUENCE {
   k2        INTEGER(0 . . . 32)      OPTIONAL, -- Need S
   mappingType      ENUMERATED {typeA, typeB},
   startSymbolAndLength      INTEGER (0 . . . 127)
}
```

TABLE 14-continued

AN EXAMPLE OF IE PUSCH-TIMEDOMAINRESOURCEALLOCATIONLIST
MODIFICATION FOR NUMBER OF REPETITIONS

```
PUSCH-TimeDomainResourceAllocationList-r16 ::= SEQUENCE (SIZE(1 . . . maxNrofUL-
Allocations-r16)) OF PUSCH-TimeDomainResourceAllocation-r16
PUSCH-TimeDomainResourceAllocation-r16 ::= SEQUENCE {
    k2-r16          INTEGER(0 . . . 32)        OPTIONAL, -- Need S
    puschAllocationList-r16         SEQUENCE (SIZE(1 . . . maxNrofMultiplePUSCHs-r16)) OF
PUSCH-Allocation-r16,
    . . .
}
PUSCH-Allocation-r16 ::= SEQUENCE {
    mappingType-r16         ENUMERATED {typeA, typeB}              OPTIONAL, -- Cond
NotFormat01-02-Or-TypeA
    startSymbolAndLength-r16        INTEGER (0 . . . 127)          OPTIONAL, -- Cond
NotFormat01-02-Or-TypeA
    startSymbol-r16         INTEGER (0 . . . 13)          OPTIONAL, -- Cond RepTypeB
    length-r16          INTEGER (1 . . . 14)          OPTIONAL, -- Cond RepTypeB
    numberOfRepetitions-r16         ENUMERATED {n1, n2, n3, n4, n7, n8, n12, n16, . . . , nK }
OPTIONAL, -- Cond Format01-02
    . . .
}
-- TAG-PUSCH-TIMEDOMAINRESOURCEALLOCATIONLIST-STOP
-- ASN1STOP
```

Certain embodiments introduce new configuration parameters for configuration of repetitions for UL. In certain embodiments, new configuration parameter are introduced for repetitions of UL transmissions. The configuration can be cell-specific and configured by MIB, SIB1 or other system information. For example, the IE PUSCH-Config-Common, BWP-UplinkCommon, UplinkConfigCommon-SIB, or servingCellConfigCommonSIB in SIB1 can be modified to include the configuration information of repetitions for PUSCH. As another example, the configuration of repetitions for PUSCH can be UE-specific, and the IEs PUSCH-ServingCellConfig or PUSCH-Config can be modified to include the configuration information of repetitions for PUSCH.

Regarding the configuration parameters in the above embodiment for new configuration parameters, in one example, the maximum number of repetitions can be used, such as by introducing the parameter "pusch-maxNumRepetition" for PUSCH configuration. A mapping between the maximum number of repetitions and the set of supported number of repetitions can be predefined. For example, denoting the maximum number of repetitions by $R_{max}$, the set of supported number of repetitions can be $$\left\{ \left\lceil \frac{R_{max}}{N_1} \right\rceil, \left\lceil \frac{R_{max}}{N_2} \right\rceil, \ldots, \left\lceil \frac{R_{max}}{N_L} \right\rceil \right\}$$

with [X] indicating the smallest integer that is no less than X, and which one repetition number in this set to be used for the UL transmission can be dynamically indicated by the DCI, e.g. the DCI to schedule the PUSCH, or the DCI for activation of Type2 UL transmission without a dynamic grant. The parameters $N_1, N_2, \ldots, N_L$ and L can be any integers, e.g., 1, 2, 4, 8, etc. In another example, the set of supported repetitions can be directly indicated in the above configuration methods.

Certain embodiments provide for an implicit indication for configuration of repetitions for UL. For implicit indication of the repetition configuration for PUSCH, similar to PDSCH, a mapping between the configuration of repetitions and the system scenarios/modes can be predefined. Once the system scenario or mode is indicated, the configuration of repetitions can be determined accordingly. For example, the number of maximum repetitions for PUSCH $R'_{max-N}$ can be predefined for system scenario or mode N, where N is an index such as 1, 2, and so forth. The predefined mapping between the maximum repetitions and system scenario or mode can be different for DL and UL transmissions. Alternatively, a set of supported number of repetitions can be predefined for each system scenario, or mode. As one example of this embodiment, the configuration of system scenario, or mode, can be cell-specific, and can be configured by system information, such as via MIB, SIB1, or other systems information. TABLE 4 provides an example for SIB1 to carry the indication of the system scenario, or mode.

In one example, the above configuration methods can be applied to both the dynamically scheduled PUSCH, and UL transmission without dynamic grant (e.g. Type1 or Type2). In another example of this embodiment, different configurations of repetitions can be applied for dynamically scheduled PUSCH and UL transmission without dynamic grant. In this example, two parameters would be indicated in the above configuration methods, e.g. "cg-pusch-maxNumRepetition" can be added to above IEs to the indicated maximum number of repetitions for UL transmission without a dynamic grant, while the parameter given in the above IEs, for example, a "pusch-maxNumRepetition" can indicate the maximum number of repetitions for dynamically scheduled PUSCH. The name of these parameters are just examples and other names can also be used. Alternatively, the above methods are applied to the dynamically scheduled PUSCH only, while the following methods for configuration of repetitions can be applied to the UL transmission without a dynamic grant. The configuration of repetitions for UL transmission without dynamic grant can be explicitly indicated in UE-specific RRC signaling, for example, in IE ConfiguredGrantConfig. The parameters r1, r2, . . . , rK can be any integers. In one example, the configuration of repetitions for UL transmission without a dynamic grant, for example, the parameter "cg-pusch-maxNumRepetition" in the IE below, can be applied to both Type1 and Type2 UL transmissions without a dynamic grant. Alternatively, different configurations of repetitions can be applied to Type1 and Type2 UL transmissions without a dynamic grant. For example, the parameter "cg-pusch-maxNumRepetition" in the IE below applied to Type2 UL transmissions without a dynamic grant, while the existing parameter "repK" in NR can be used for configuration of repetitions for Type1 UL transmissions without dynamic grant.

TABLE 15

AN EXAMPLE OF IE CONFIGUREDGRANTCONFIG MODIFICATION FOR INDICATION OF MAX TBS

```
ConfiguredGrantConfig ::=     SEQUENCE {
   frequencyHopping         ENUMERATED {intraSlot, interSlot}       OPTIONAL, --
Need S
   cg-DMRS-Configuration     DMRS-UplinkConfig,
   mcs-Table                ENUMERATED {qam256, qam64LowSE}          ...
   repK                     ENUMERATED {n1, n2, n4, n8},
   repK-RV                  ENUMERATED {s1-0231, s2-0303, s3-0000}   ...
     cg-pusch-maxNumRepetition        ENUMERATED {r1, r2, . . . , rN}
OPTIONAL, -- Cond NTN
}
```

In certain embodiments, the target code rate for each MCS index can be reduced, which can be configured by one or more of the above approaches. For example, denote the target code rate for MCS index n by $R_n$, where $R_n$ can be determined based on the MCS table in NR, e.g. Table 5.1.3.1-1, Table 5.1.3.1-2, Table 5.1.3.1-3, Table 6.1.4.1-1, or Table 6.1.4.1-2 in TS [38.214] 3GPP, TS 38.214, 5G; NR; Physical layer procedures for data. When the reduced target code rate is configured, the target code rate $R_n$ for MCS index n can be $R_n/M$, where M can be any value (e.g. 1, 2, 4, and so forth) and can be predefined or configured. In examples where M is configured, the configuration methods disclosed above can be used.

Repetition Pattern and RV Determination

In certain embodiments, for the RV determination of PDSCH when repetitions are configured, the RV can be determined in the same way as when the pdsch-AggregationFactor or repetitionNumber is configured in NR. Specifically, denoting the number of repetitions indicated by the DCI by R, UE 116 can expect that the TB is repeated within each symbol allocation among each of the R consecutive slots, and the RV applied to $n^{th}$ transmission occasion of the TB for n=0, 1, . . . , R−1, is determined according to Table 5.1.2.1-2 in [38.214-3GPP, TS 38.214, 5G; NR; Physical layer procedures for data]. The RV in first transmission occasion is indicated by DCI for dynamically scheduled PDSCH, and is set to 0 for SPS PDSCH. Alternatively, the RV in first transmission occasion for both dynamically scheduled PDSCH and SPS PDSCH can be assumed to be a predefined value, such as, 0, or to a value configured by higher layer signaling. The RV indication in the DCI for scheduling of PDSCH can be reused for other indications, for example, the indication of number of repetitions for PDCCH or PDSCH.

For the RV determination of PUSCH when repetitions are configured, in one example, the RV can be determined in the same way as when the pusch-AggregationFactor or repK is configured or numberofrepetitions is present in the resource allocation table configured for PUSCH in NR. Specifically, both RepTypeA and RepTypeB can be supported, and which type to be used can be based on the configuration parameters, e.g. PUSCHRepTypeIndicator-ForType1Configuredgrant, PUSCHRepTypeIndicator-ForDCIFormat0_1, or PUSCHRepTypeIndicator-ForDCIFormat0_2. For PUSCH scheduled by DCI, the first RV can be indicated by DCI, and the RV applied to $n^{th}$ transmission occasion is determined according to Table 6.1.2.1-2 [38.214-3GPP, TS 38.214, 5G; NR; Physical layer procedures for data]. For Type 1 or Type2 configured grant PUSCH transmission, the higher layer configured parameter repK-RV defines the redundancy version pattern to be applied to the repetitions.

If the parameter repK-RV is not provided in the configuredGrantConfig, the redundancy version for each actual repetition with a configured grant can be set to 0. In another example, for PUSCH dynamically scheduled by the DCI, the first RV can be fixed to certain value, e.g. 0. Alternatively, for PUSCH dynamically scheduled by the DCI, the first RV can be configured by higher layer signaling, e.g. by cell-specific signaling such as MIB, SIB1 or other SIBS, or by UE-specific signaling such as PUSCH-ServingCellConfig or PUSCH-config. In the latter two examples, the RV indication in the DCI for scheduling of PUSCH can be reused for other indications, e.g. the indication of number of repetitions for PUSCH.

Figure 9:
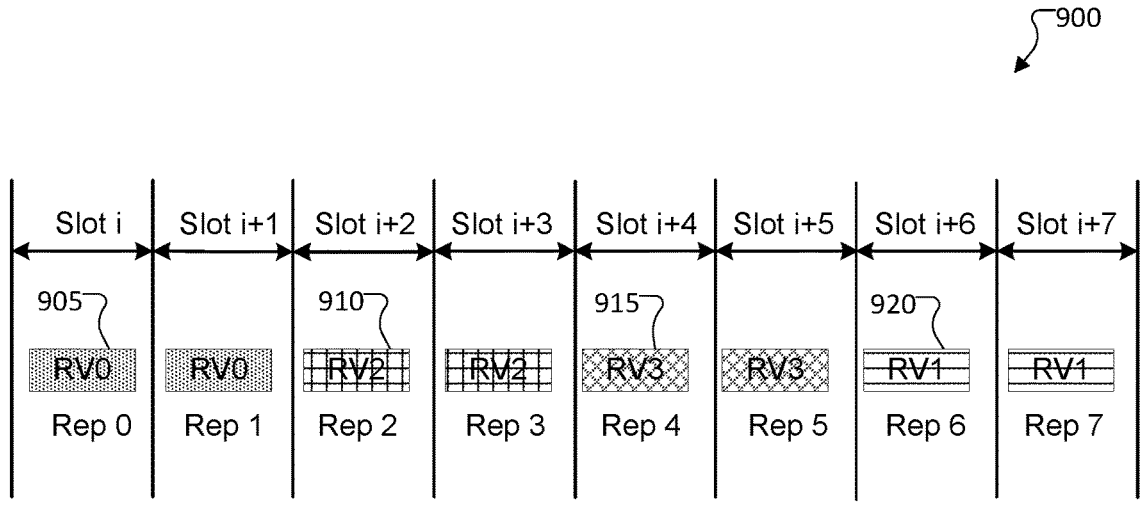
FIGS. 9 and 10 illustrate redundancy version patterns according to embodiments of the present disclosure.
Figure 10:
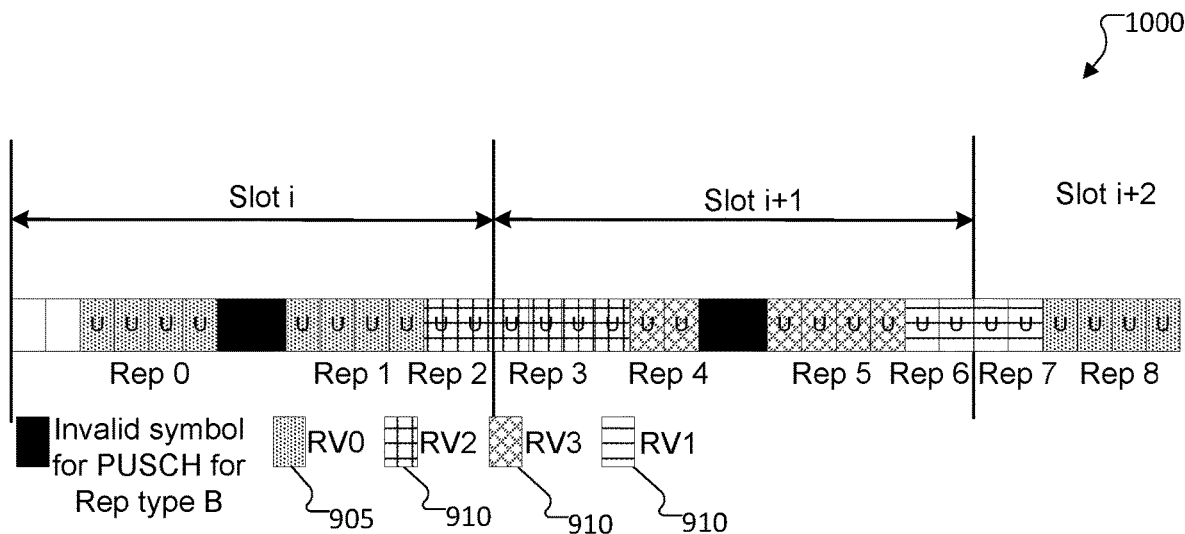

FIGS. 9 and 10 illustrate RV patterns according to embodiments of the present disclosure. The embodiments of the RV pattern 900 shown in FIG. 9 and RV pattern 1000 shown in FIG. 10 are for illustration only. Other embodiments could be used without departing from the scope of the present disclosure. FIGS. 9 and 10 provide examples of PUSCH repetitions, for repetition type A and B respectively, where N is assumed to be 2 in the examples.

In certain embodiments, a RV cycling pattern 900, for repetition type A, includes an RV being repeated over one or more times. For example, the RV cycling order still follows the NR mechanism, e.g. based on the sequence of 0, 2, 3, 1, or based on the pattern configured by repK-RV for configured grant UL transmissions, while the same RV is repeated over N times before the RV cycling, across the repeated transmissions. That is, as shown in the example illustrated in FIG. 9, the RV cycling pattern 900 includes a sequence of RV0 905 in slot i and slot i+1; RV2 910 in slot i+2 and slot i+3; RV3 915 in slot i+4 and slot i+5; and RV1 920 in slot i+6 and slot i+7.

Additionally, RV cycling pattern 1000, for repetition type B, includes an RV being repeated over one or more times. The RV cycling order still follows the NR mechanism, e.g. based on the sequence of 0, 2, 3, 1, or based on the pattern configured by repK-RV for configured grant UL transmissions, while the same RV is repeated over N times before the RV cycling, across the repeated transmissions. That is, as shown in the example illustrated in FIG. 10, the starting symbol relative to the start of the slot is assumed to be 2, the number of consecutive symbols from starting symbol allocated for PUSCH is assumed to be 4, and number of repetitions is assumed to be 8. Furthermore, the RV cycling pattern 1000 includes a sequence in which slot i includes RV0 905 and part of RV2 910, slot i+1 includes a remainder of RV2

910, RV3 915, and a part of RV1 920, while and slot i+2 includes a remainder of RV1 920 and a part of RV0 905.

In certain embodiments, the RV for $n^{th}$ transmission occasion of PDSCH across the repetitions is determined based on Table 5.1.2.1-2 [38.214-3GPP, TS 38.214, 5G; NR; Physical layer procedures for data] by revising the equation of 'n mod 4' to '$\lfloor n/N \rfloor$ mod 4', as illustrated by TABLE 16 a). This can be applied to both DCI scheduled PDSCH and/or SPS PDSCH. The first RV for the SPS PDSCH can be predefined to certain value, or configured by higher layer signaling such as SPS-Config. For PUSCH, TABLE 16 b) provides an example for RV determination. This can be applied to PUSCH scheduled by the DCI. For configured grant PUSCH, the RV cycling pattern can be configured by repK-RV, while each RV can be repeated N times before the RV cycling. The parameter N can be predefined, such as to 2, 4, 8, and so forth. Alternatively, the parameter N can be configured. In one example, the parameter N can be explicitly indicated by higher layer signaling, e.g. by cell-specific signaling such as MIB, SIB1 or other SIBS, or by UE-specific signaling such as PDSCH-ServingCellConfig or PDSCH-config for PDSCH, and PUSCH-ServingCellConfig or PUSCH-config for PUSCH. In another example, the parameter N can be implicitly indicated. For example, the parameter N can be based on the number of repetitions configured for the PDCCH, PDSCH and/or PUSCH transmissions. There can be a predefined mapping between the value of parameter N, and the number of repetitions, e.g. N=1 for number of repetitions smaller than a certain value (e.g. 8) and N=2 otherwise. As another example, the parameter N can be implicitly indicated based on system scenario/mode. For example, there can be a predefined mapping between the value of N and the system scenario/mode, where the system scenario/mode can be indicated by the higher layer signaling e.g. as illustrated by TABLE 4. In another example, the parameter N can be dynamically indicated by DCI. For example, a set of possible values can be predefined or configured via the above method, and DCI can indicate one of these values to be used.

In certain embodiments, frequency hopping is supported when the repetition is configured. In one example, the inter-slot frequency hopping can be supported for PUSCH repetition type A. For example, with RV cycling occurs every N repetitions, the frequency hopping interval can also be aligned with RV cycling pattern, where frequency hopping occurs every N slots when frequency hopping is configured. In another example, inter-repetition can be supported for PUSCH repetition type B, for example, the frequency hopping occurs every N actual repetitions when the inter-repetition frequency hopping is configured. In yet another example, the inter-slot frequency hopping is not supported when the parameter N for RV cycling is more than 1 for repetition type B. Alternatively, the inter-slot frequency hopping can be supported. For example, the inter-slot frequency hopping can occur when the RV cycles between the repetitions at the end of the previous slot and at the start of the slot, and can be skipped when the RV is the same for repetitions at the end of the previous slot and at the start of the slot. As another example, when the inter-slot frequency hopping is configured, the RV cycling pattern applies slot by slot, that is, RV cycling occurs every N actual repetitions within a slot, and RV cycling occurs at the first repetition transmission within each slot.

TABLE 16 A

RV DETERMINATION FOR PDSCH

| $rv_{id}$ indicated by | $rv_{id}$ to be applied to $n^{th}$ transmission occasion | | | |
|---|---|---|---|---|
| the DCI scheduling the PDSCH | $\lfloor n/N \rfloor$ mod 4 = 0 | $\lfloor n/N \rfloor$ mod 4 = 1 | $\lfloor n/N \rfloor$ mod 4 = 2 | $\lfloor n/N \rfloor$ mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

TABLE 16 B

RV DETERMINATION FOR PUSCH

| $rv_{id}$ indicated by the | $rv_{id}$ to be applied to $n^{th}$ transmission occasion (repetition Type A) or $n^{th}$ actual repetition (repetition Type B) | | | |
|---|---|---|---|---|
| DCI scheduling the PUSCH | $\lfloor n/N \rfloor$ mod 4 = 0 | $\lfloor n/N \rfloor$ mod 4 = 1 | $\lfloor n/N \rfloor$ mod 4 = 2 | $\lfloor n/N \rfloor$ mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

Figure 11:
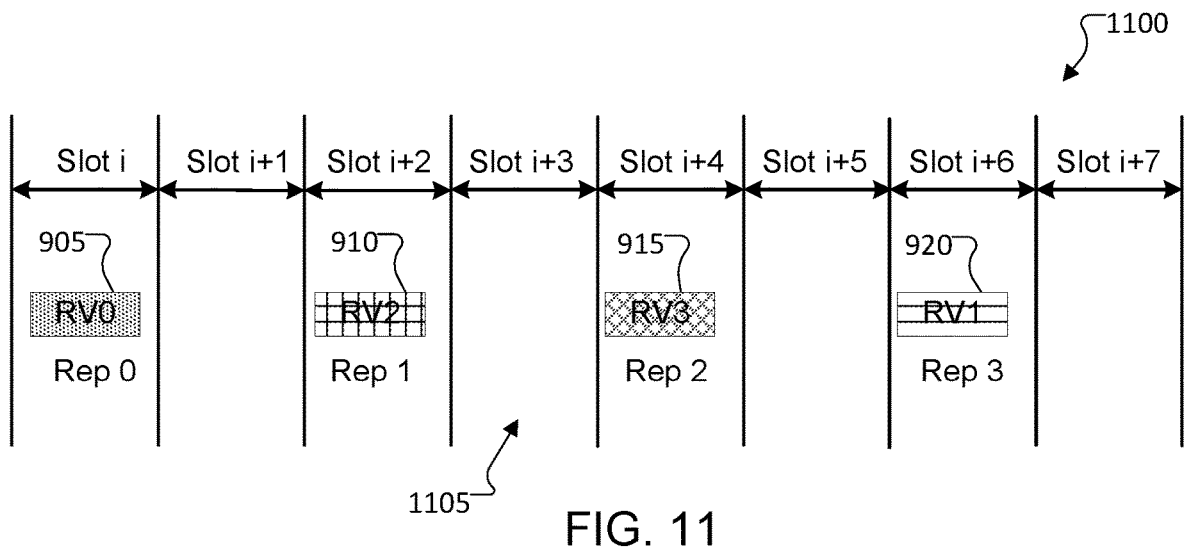
FIG. 11 illustrates an example transmission pattern when repetitions are configured according to embodiments of the present disclosure.

FIG. 11 illustrates an example transmission pattern when repetitions are configured according to embodiments of the present disclosure. The embodiment of the transmission pattern 1100 shown in FIG. 11 is for illustration only. Other embodiments could be used without departing from the scope of the present disclosure.

In one example, a gap 1105 is positioned between every M repetitions. For example, there can be K slots reserved for gap duration every M repetitions. The parameters K and M can be predefined, or can be configured. In the example shown in FIG. 11, K and M are one slot. In the examples in which K and/or M is configured, the configuration can be indicated by higher layer signaling, such as by cell-specific signaling such as MIB, SIB1 or other SIBS, or by UE-specific signaling such as PDCCH-ServingCellConfig or PDCCH-config for PDCCH, PDSCH-ServingCellConfig or PDSCH-config for PDSCH, or PUSCH-ServingCellConfig or PUSCH-config for PUSCH. In one example, for SPS PDSCH, the parameters K and/or M can be configured by SPS-Config. For configured grant PUSCH, the parameters K and/or M can be configured by ConfiguredGrantConfig in some examples. In another example, a mapping between the value of K and/or M and the system scenario/mode can be predefined. In yet another example, the K and/or M can be indicated by DCI, such as DCI scheduling PDSCH and/or DCI for SPS activation for DL transmission, and DCI scheduling PUSCH and/or DCI for activation of Type2 UL transmission without dynamic grant. When K is 0, no gap exists between repetitions.

Indication for Repetitions

In certain embodiments, the number of repetitions are dynamically indicated in the DCI, by configuring the number of repetitions in the time domain resource assignment (TDRA) table. Larger number of entries can be supported for PDSCH and/or PUSCH TDRA tables, compared to NR systems. For example, as discussed above, the parameter maxNrofDL-Allocations and/or maxNrofUL-Allocations can be extended for PDSCH and/or PUSCH, respectively, e.g. to 32, 64, 128 for PDSCH and/or 128 for PUSCH, and so forth. In another example, a dedicated field can be added to the DCI for the indication of number of repetitions for PDCCH, PDSCH and/or PUSCH. For the indication of RV cycling pattern, and/or the indication of presence of a gap between certain number of repetitions as discussed above, one example is to indicate these in the DCI. For these indications which include one or more of the indications for RV cycling pattern, presence of a gap between certain number of repetitions and/or number of repetitions, the following embodiments can be used.

Certain embodiments provide an approach (Approach I) for jointly configuring with HARQ disabling for PDSCH.

In one example, when the HARQ disabling for PDSCH is configured, one or more bits in the fields in the DCI such as 'PDSCH-to-HARQ feedback timing indicator' and/or 'Downlink assignment index' and/or 'Redundancy version' can be used for the indication related to repetitions, for example, for indication of number of repetitions, and/or RV cycling pattern, and/or the presence of a gap between certain number of repetitions. For the indication of number of repetitions, in one example, one or more bits in the above fields can be jointly used together with the 'Time domain resource assignment' field, e.g. the MSBs of the TDRA entry indication is from the 'Time domain resource assignment' field, while the LSBs of the TDRA entry indication use one or more bits in 'PDSCH-to-HARQ feedback timing indicator' and/or 'Downlink assignment index' and/or 'Redundancy version' fields, where the TDRA includes a column for number of repetitions. In another example, one or more bits in the 'PDSCH-to-HARQ feedback timing indicator' and/or 'Downlink assignment index' and/or 'Redundancy version' fields can be used to indicate the RV cycling pattern, e.g. whether the RV should be repeated over certain number of repetition before the RV cycling. In yet another example, one or more bits in the 'PDSCH-to-HARQ feedback timing indicator' and/or 'Downlink assignment index' and/or 'Redundancy version' fields can be used to indicate the presence of the gap between certain number of repetitions. In certain embodiments with PDCCH repetitions, in one example, one or more bits in the 'PDSCH-to-HARQ feedback timing indicator' and/or 'Downlink assignment index' and/or 'Redundancy version' fields can be used to indicate the number of repetitions for PDCCH.

Certain embodiments provide an approach (Approach II) for jointly configuring with MCS index limitation.

In certain embodiments, when the MCS index limitation is configured, one or more bits in the 'Modulation and coding scheme' field can be reused for the indication of number of repetitions, and/or RV cycling pattern, and/or the presence of a gap between certain number of repetitions. For example, the MSBs of the TDRA entry indication is from the 'Time domain resource assignment' field, while the LSBs of the TDRA entry indication use one or more bits in 'Modulation and coding scheme' field, where the TDRA includes a column for number of repetitions. In another example, one or more bits in the 'Modulation and coding scheme' field can be used to indicate the RV cycling pattern, e.g. whether the RV should be repeated over certain number of repetition before the RV cycling. In yet another example, one or more bits in the 'Modulation and coding scheme' field can be used to indicate the presence of the gap between certain number of repetitions. In certain embodiments with PDCCH repetitions, in one example, one or more bits in the 'Modulation and coding scheme' field can be used to indicate the number of repetitions for PDCCH.

Certain embodiments provide an approach (Approach III) for RV field reinterpretation.

In certain embodiments, the RV for the first repetition is fixed to certain value, such as 0. One or more bits in the 'Redundancy version' field can be used for the indication of number of repetitions, and/or RV cycling pattern, and/or the presence of a gap between certain number of repetitions. For example, the MSBs of the TDRA entry indication is from the 'Time domain resource assignment' field, while the LSBs of the TDRA entry indication use one or more bits in the 'Redundancy version' field, where the TDRA includes a column for number of repetitions. In another example, one or more bits in the 'Redundancy version' field can be used to indicate the RV cycling pattern, such as whether the RV should be repeated over certain number of repetition before the RV cycling. In yet another example, one or more bits in the 'Redundancy version' field can be used to indicate the presence of the gap between certain number of repetitions. In certain embodiments with PDCCH repetitions, in one example, one or more bits in the 'Redundancy version' field can be used to indicate the number of repetitions for PDCCH.

Certain embodiments provide an approach (Approach IV) for adding more bits

In certain embodiments, the DCI can have additional bits for the indication of number of repetitions for PDSCH and/or PDCCH, and/or RV cycling pattern, and/or the presence of a gap between certain number of repetitions.

Certain embodiments provide an approach (Approach V) for a time domain resource allocation field.

In certain embodiments, time domain resource allocation field can be used for the indication of number of repetitions for PDSCH and/or PDCCH, and/or RV cycling pattern, and/or the presence of a gap between certain number of repetitions. For example, additional columns for RV cycling pattern, and/or the presence of a gap between certain number of repetitions can be added to the time domain resource allocation list.

A combination of any one or more of the above approaches can be supported. Different indication methods can be used for different indications, e.g. Approach III above for indication of number of repetitions, and Approach I, II and/or IV above for indication of RV cycling pattern, or vice versa. In one example, the same number of repetitions for PDSCH and PDCCH can be applied, where the number of repetitions can be indicated by one or any combination of the above approaches. In another example, Approach IV can be used jointly with Approach V. For example, the time domain resource allocation field can indicate number of repetitions R0, e.g. in the way similar to NR system, while an additional field can be added to indicate value X, where the number of repetitions indicated by this DCI can be determined as R0+X, or R0*X.

Figure 12:
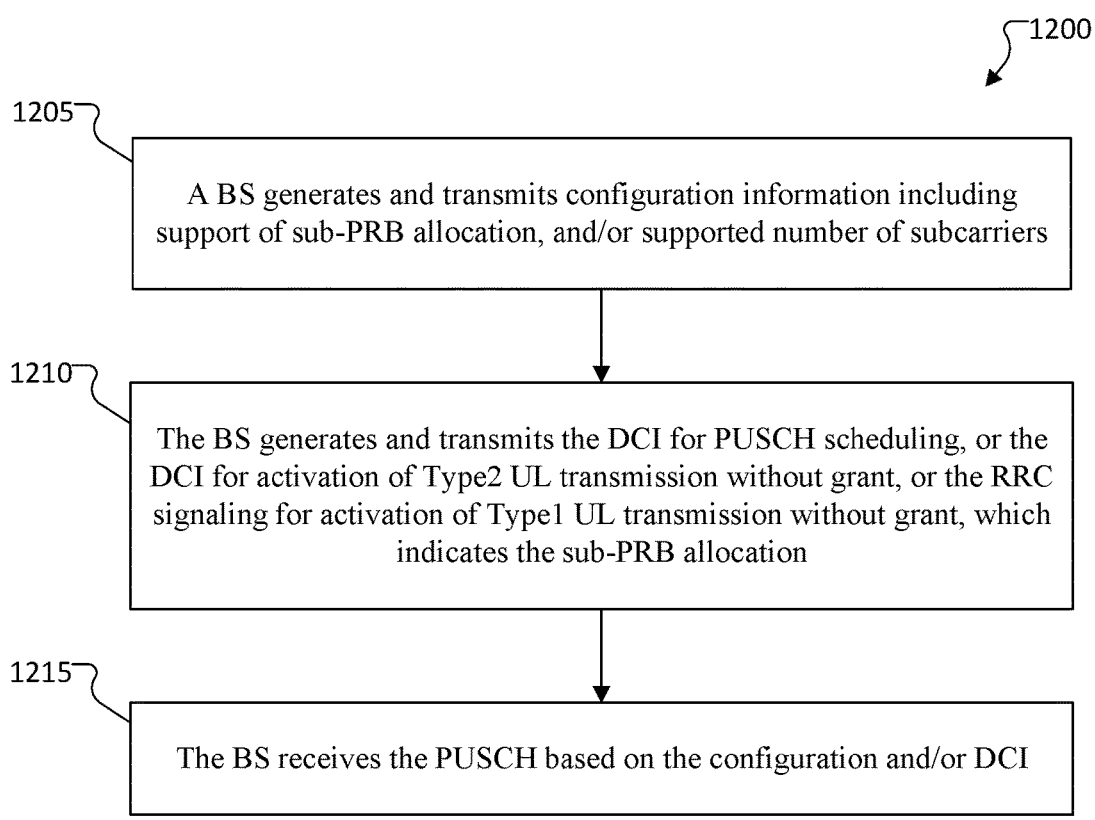
FIG. 12 illustrates a process for sub-physical resource block configuration and indication for a physical uplink shared channel according to embodiments of the present disclosure.

FIG. 12 illustrates a process for sub-physical resource block configuration and indication for a physical uplink shared channel according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a gNB. Process 1200 can be accomplished by, for example, gNB 101, 102, and 103 in network 100.

Certain embodiments provide for frequency resource allocation with granularity smaller than 1 PRB. Certain embodiments disclose frequency resource allocation with granularity smaller than 1 PRB, which is also referenced herein as "sub-PRB allocation". In certain embodiments described, sub-PRB for UL transmission is given as an example, while the proposed design can be extended to DL transmission as well.

At operation 1205, gNB 102 generates and transmits configuration information. The configuration information includes a support of sub-PRB allocation, a supported number of subcarriers, or a combination thereof. In one example, the supported subcarrier spacing for sub-PRB allocations can be predefined. In another example, the supported subcarrier spacing for each configured sub-PRB allocation can be configured. The indications for configuration of sub-PRB allocation can be explicit or implicit. In certain embodiments, The indications for configuration of sub-PRB allocation are cell-specific. In certain embodiments, The indications for configuration of sub-PRB allocation are UE-specific.

At operation 1210, gNB 102 generates and transmits the DCI for scheduling of PUSCH, or the DCI for activation of Type2 UL transmission without a dynamic grant, or the RRC signaling for activation of Type1 UL transmission without dynamic grant, which carries the indication information for the sub-PRB allocation. For the DCI scheduling PUSCH, and/or the DCI for activation of Type2 UL transmission without dynamic grant, one or more additional bits, and/or one or more bits in certain DCI field(s) can be used for the indication of sub-PRB allocation for PUSCH. In certain embodiments, the supported maximum MCS index can be configured to be limited to certain number, and one or more bits in the MCS field can be reused for the indication of sub-PRB allocation. In certain embodiments, the redundancy version is predefined or limited within certain value, and one or more bits in redundancy version field can be reused for the indication of the sub-PRB allocation.

At operation 1215, gNB 102 receives the PUSCH. In certain embodiments, the gNB 102 receives the PUSCH based on the configuration. In certain embodiments, the gNB 102 receives the PUSCH based on DCI. In certain embodiments, the gNB 102 receives the PUSCH based on both the configuration and the DCI.

Figure 13:
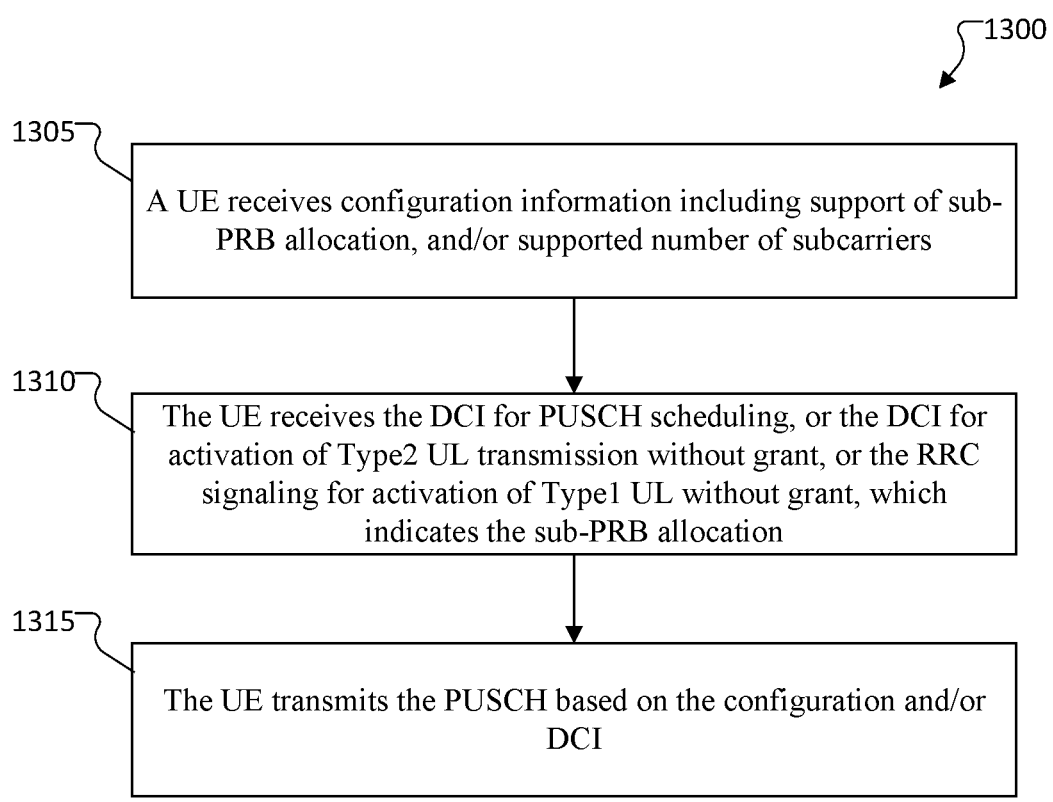
FIG. 13 illustrates a process for determination of a sub-physical resource block allocation for a physical uplink shared channel transmission according to embodiments of the present disclosure.

FIG. 13 illustrates a process for determination of a sub-physical resource block allocation for a physical uplink shared channel transmission according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a UE. Process 1300 can be accomplished by, for example, UE 114, 115, and 116 in network 100.

At operation 1305, UE 116 receives the configuration information. In certain embodiments, the configuration information includes an indication to enable or disable a sub-PRB allocation. In certain embodiments, the configuration information includes a supported number of subcarriers for sub-PRB allocation. In certain embodiments, the supported subcarrier spacing for sub-PRB allocations is predefined. In certain embodiments, the supported subcarrier spacing for each configured sub-PRB allocation is configured. The indications for configuration of a sub-PRB allocation can be explicit or implicit. In certain embodiments, the indication is cell-specific. In certain embodiments, the indication is UE-specific.

At operation 1310, UE 116 receives the DCI for scheduling of PUSCH, or the DCI for activation of Type2 UL transmission without dynamic grant, or the RRC signaling for activation of Type1 UL transmission without dynamic grant, which carries the indication information for sub-PRB allocation. For the DCI scheduling PUSCH or activating the Type2 UL transmission without dynamic grant, one or more additional bits, and/or one or more bits in certain DCI field(s) can be used for the indication of sub-PRB allocation for the PUSCH. In one example, the supported maximum MCS index can be configured to be limited to certain number, and one or more bits in the MCS field can be reused for the indication of sub-PRB allocation. In certain embodiments, the redundancy version can be predefined or be limited within certain value, and one or more bits in redundancy version field can be reused for the indication of the sub-PRB allocation.

At operation 1315, UE 116 transmits the PUSCH. The UE 116 transmits the PUSCH based on both the configuration and DCI indication.

Configuration of the Sub-PRB Allocation

In certain embodiments of process 1200 and process 1300, the support of sub-PRB allocation can be UE capability. The BS configures the sub-PRB allocation based on UE capability.

Certain embodiments provide an approach (Approach A) for explicit indication for configuration of sub-PRB allocation for PUSCH.

In certain embodiments of operation 1205 and operation 1305, the configuration of sub-PRB allocation is explicit. For example, the configuration of sub-PRB allocation can be cell-specific, and can be configured by system information, such as MIB, SIB1, other SIBs and/or a new SIB introduced for the considered systems. An example of using SIB1 for the explicit indication is as follows, where the IEs BWP-UplinkCommon, UplinkConfigCommonSIB, or serving-CellConfigCommonSIB in SIB1 can be modified. In this example, the IE PUSCH-ConfigCommon in IE BWP-UplinkCommon is modified. The condition tag Cond NTN' refers to the NTN systems. The condition tag 'Cond NTN' throughout this DOI is given as examples, and should be considered in inclusive manner. For systems other than NTN, the condition tag can be changed accordingly.

TABLE 17

AN EXAMPLE OF IE PUSCH-CONFIGCOMMON MODIFICATION FOR
INDICATION OF SUB-PRB ALLOCATION CONFIGURATION

PUSCH-ConfigCommon ::=      SEQUENCE {
  groupHoppingEnabledTransformPrecoding ENUMERATED {enabled}
OPTIONAL, -- Need R
  pusch-TimeDomainAllocationList    PUSCH-TimeDomainResourceAllocationList
OPTIONAL, -- Need R

TABLE 17-continued

AN EXAMPLE OF IE PUSCH-CONFIGCOMMON MODIFICATION FOR INDICATION OF SUB-PRB ALLOCATION CONFIGURATION

```
    msg3-DeltaPreamble      INTEGER (-1 . . . 6)           OPTIONAL, -- Need R
    p0-NominalWithGrant     INTEGER (-202 . . . 24)        OPTIONAL, -- Need R
    pusch-EnabledSubPRB     ENUMERATED {true}              OPTIONAL, -- Cond NTN
    . . .
}
```

As another example of explicit indication, the sub-PRB allocation configuration can be UE-specific, and can be configured by UE-specific RRC signaling. An example of the configuration can be as follows, where the IE PUSCH-ServingCellConfig is modified.

TABLE 18

AN EXAMPLE OF IE PUSCH-SERVINGCELLCONFIG MODIFICATION FOR INDICATION OF SUB-PRB ALLOCATION CONFIGURATION

```
PUSCH-ServingCellConfig ::=       SEQUENCE {
    codeBlockGroupTransmission      SetupRelease { PUSCH-CodeBlockGroupTransmission }   OPTIONAL, -- Need M
    rateMatching             ENUMERATED {limitedBufferRM}          OPTIONAL, -- Need S
    xOverhead                ENUMERATED {xoh6, xoh12, xoh18 }      OPTIONAL, -- Need S
    . . . ,
    [[
    maxMIMO-Layers           INTEGER (1 . . . 4)           OPTIONAL, -- Need M
    processingType2Enabled   BOOLEAN                       OPTIONAL -- Need M
    ]],
    [[
    maxMIMO-LayersForDCI-Format0-2-r16    INTEGER (1..4)   OPTIONAL -- Need M
    ]]
    pusch-EnabledSubPRB      ENUMERATED {true}             OPTIONAL, -- Cond NTN
}
```

In the above example, the same sub-PRB allocation configuration is applied to all UE's BWPs of one serving cell. Alternatively, the sub-PRB allocation can be configured as UE-specific value of a BWP, via IE PUSCH-Config in IE BWP-UplinkDedicated.

cally scheduled PUSCH and UL transmission without dynamic grant. In another example of this embodiment, different sub-PRB allocation configurations can be applied for dynamically scheduled PUSCH and UL transmission without dynamic grant. In this example, two parameters can be indicated in the above configuration methods, e.g. "cg-pusch-EnabledSubPRB" can be added to above IEs to indicated sub-PRB allocation configuration for UL transmission without dynamic grant, while the parameter given in the above IEs e.g. "pusch-EnabledSubPRB" can indicate the

TABLE 19

AN EXAMPLE OF IE PUSCH-CONFIG MODIFICATION FOR INDICATION OF SUB-PRB ALLOCATION CONFIGURATION

```
PUSCH-Config ::=         SEQUENCE {
    dataScramblingIdentityPUSCH     INTEGER (0 . . . 1023)     OPTIONAL, -- Need S
    txConfig         ENUMERATED {codebook, nonCodebook}        OPTIONAL, -- Need S
    dmrs-UplinkForPUSCH-MappingTypeA    SetupRelease { DMRS-UplinkConfig }   OPTIONAL, -- Need M
    dmrs-UplinkForPUSCH-MappingTypeB    SetupRelease { DMRS-UplinkConfig }   OPTIONAL, -- Need M
    . . .
    ul-FullPowerTransmission-r16    ENUMERATED {fullpower, fullpowerModel, fullpoweMode2}   OPTIONAL -- Need R
    ]]
    pusch-EnabledSubPRB      ENUMERATED {true}              OPTIONAL, -- Cond NTN
}
```

In certain embodiments, the above configuration methods can be applied to both the dynamically scheduled PUSCH, and UL transmission without dynamic grant (e.g. Type1 or Type2). In one example of this embodiment, the same sub-PRB allocation configuration is applied to both dynamisub-PRB allocation configuration for dynamically scheduled PUSCH. The name of these parameters are just examples and other names can also be used. Alternatively, the above methods are applied to the dynamically scheduled PUSCH only, while the following methods for configuration of sub-PRB allocation can be applied to the UL transmission without a dynamic grant. The sub-PRB allocation configuration for PUSCH without a dynamic grant can be explicitly indicated in UE-specific RRC signaling, e.g. in IE ConfiguredGrantConfig. In certain embodiments, the configuration of the sub-PRB allocation for UL transmission without dynamic grant, e.g. the parameter "cg-pusch-EnabledSubPRB" in the IE below, can be applied to both Type1 and Type2 UL transmissions without dynamic grant. Alternatively, different configurations of sub-PRB allocations can be applied to Type1 and Type2 UL transmissions without dynamic grant. For example, the parameter "cg-pusch-EnabledSubPRB" in the IE below applied to Type2 UL transmissions without dynamic grant, while another parameter "cg1-pusch-EnabledSubPRB" can be introduced to the IE ConfiguredGrantConfig for indication of maximum TBS for Type1 UL transmissions without dynamic grant.

TABLE 20

AN EXAMPLE OF IE CONFIGUREDGRANTCONFIG MODIFICATION FOR INDICATION OF SUB-PRB ALLOCATION CONFIGURATION

```
ConfiguredGrantConfig ::=    SEQUENCE {
   frequencyHopping     ENUMERATED {intraSlot, interSlot}    OPTIONAL, --
Need S
   . . .
   autonomousReTx-r16    ENUMERATED {enabled}    OPTIONAL -- Cond
LCH-BasedPrioritization
   ]]
   cg-pusch-EnabledSubPRB    ENUMERATED {true}
OPTIONAL, -- Cond NTN
}
```

Certain embodiments provide an approach (Approach B) for implicit indication for configuration of sub-PRB allocation for PUSCH.

In certain embodiments of operation 1205 and operation 1305, the indication of sub-PRB allocation configuration is implicit. As one example, a mapping between the supported sub-PRB allocations and the system scenarios/modes can be predefined. Once the system scenario or mode is indicated, the supported sub-PRB allocations can be determined accordingly, e.g. $S_N$ for system scenario/mode N, where N is an index such as 1, 2, etc., and $S_N$ indicates a set of supported sub-PRB allocations. As one example of this embodiment, the configuration of system scenario, or mode, can be cell-specific, and can be configured by system information, e.g. via MIB, SIB1 other SIBs and/or a new SIB introduced for the systems. For example, one reserved bit in MIB can be used to indicate two scenarios, or modes. Another example of using SIB1 for this indication is illustrated below, where the parameter N can be any integer. The parameter in the example below uses "NTNmode" as an example for NTN systems, while other names can be used for other systems. In one example, the mapping between the supported sub-PRB allocations and the system scenarios, or modes, can be the same for dynamically scheduled PUSCH and UL transmission without grant. Alternatively, different mappings between the supported sub-PRB allocations and the system scenarios, or modes, can be predefined for dynamically scheduled PUSCH and UL transmission without grant. For example, this example can be applied for configuration of sub-PRB allocation for dynamically scheduled PUSCH, while the supported sub-PRB allocations for UL transmission without grant can be configured separately, or vice versa.

Figure 14:
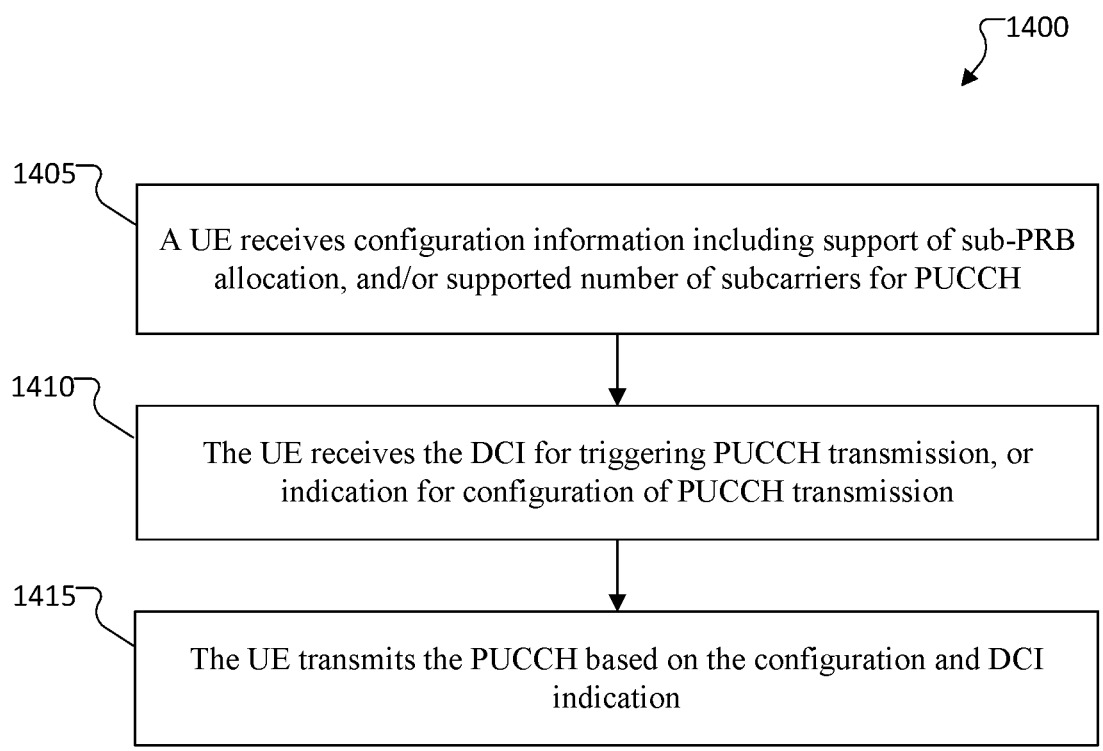
FIG. 14 illustrates a process for determination of a sub-physical resource block allocation for a physical uplink control channel according to embodiments of the present disclosure.

FIG. 14 illustrates a process for determination of a sub-physical resource block allocation for a physical uplink control channel according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a UE. Process 1400 can be accomplished by, for example, UE 114, 115, and 116 in network 100.

In certain embodiments, sub-PRB allocation for PUCCH is not supported. Alternatively, sub-PRB allocation for PUCCH can be configured.

At operation 1405, UE 116 receives the configuration information. In certain embodiments, the configuration information includes an indication to enable or disable a sub-PRB allocation. In certain embodiments, configuration information includes a supported number of subcarriers for sub-PRB allocation of PUCCH. The indications for configuration of sub-PRB allocation can be explicit or implicit. In certain embodiments, the indications for configuration of sub-PRB allocation is cell-specific. In certain embodiments, the indications for configuration of sub-PRB allocation is UE-specific.

At operation 1410, UE 116 receives the DCI for triggering of PUCCH transmission, or the signaling for configuration of PUCCH transmission.

At operation 1415, UE 116 transmits the PUCCH based on the configuration and/or DCI indication.

Certain embodiments provide an approach (Approach C) for indication for configuration of sub-PRB allocation for PUCCH.

In one example of operation 1405, the configuration of sub-PRB allocation for PUCCH can use the embodiments in Approaches A and B above. In certain embodiments, the configuration of sub-PRB allocation for PUCCH can be cell-specific, such as indicated by MIB, SIB1 or other Ms. For example, the IEs BWP-UplinkCommon, UplinkConfigCommonSIB, or servingCellConfigCommonSIB in SIB1 can be modified. In this example, the IE PUCCH-ConfigCommon in IE BWP-UplinkCommon is modified. As another example of explicit indication, the sub-PRB allocation configuration can be UE-specific, and can be configured by UE-specific RRC signaling. One example of the configuration can be indicated by the IE PUCCH-Config, e.g. adding the configuration of sub-PRB allocation to the field 'PUCCH-Resource'.

TABLE 21

AN EXAMPLE OF IE PUCCH-CONFIGCOMMON MODIFICATION FOR
INDICATION OF SUB-PRB ALLOCATION CONFIGURATION

```
PUCCH-ConfigCommon ::=       SEQUENCE {
  pucch-ResourceCommon       INTEGER (0 . . . 15)        OPTIONAL, -- Cond
InitialBWP-Only
  pucch-GroupHopping         ENUMERATED { neither, enable, disable },
  hoppingId       INTEGER (0..1023)                  OPTIONAL, -- Need R
  p0-nominal      INTEGER (−202 . . . 24)            OPTIONAL, -- Need R
  pucch-EnabledSubPRB        ENUMERATED {true}
OPTIONAL, -- Cond NTN
  . . .
}
```

In the above examples for PUSCH and PUCCH configuration, the configuration information can indicate whether the sub-PRB for PUSCH/PUCCH is enabled or not. In one example, the supported sub-PRB allocations can be pre-defined. In another example, the supported sub-PRB allocations can be explicitly indicated via above configuration methods, e.g. by indicating supported number of subcarriers for the sub-PRB allocation such as single-tone, two-tone, three-tone, and/or six-tone allocations, etc. In yet another example, the supported numerology can be configured via the above configuration methods. For example, the supported subcarrier spacing for certain sub-PRB allocation can be configured explicitly via above configuration methods. Alternatively, a predefined mapping between the supported subcarrier spacing and sub-PRB allocation can be used, and once the supported sub-PRB allocation is configured via one or more of the above configuration methods, the supported subcarrier spacing can be determined accordingly.

Figure 15:
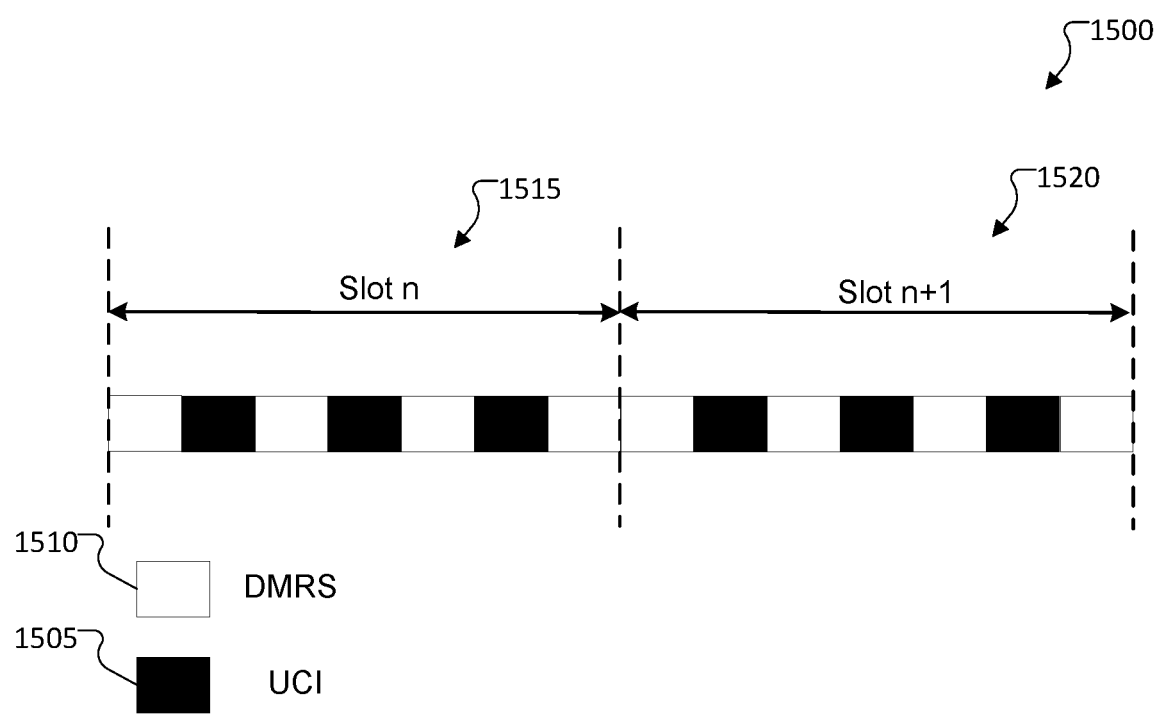
FIG. 15 illustrates an example physical uplink control channel format 1 transmission with six-tone allocation according to embodiments of the present disclosure.

FIG. 15 illustrates an example physical uplink control channel format 1 transmission with six-tone allocation according to embodiments of the present disclosure. The embodiment of the PUCCH Format 1 transmission 1500 shown in FIG. 15 is for illustration only. Other embodiments could be used without departing from the scope of the present disclosure.

Design of the Sub-PRB Allocation

The sub-PRB allocation for PUSCH can be based on sub-PRB allocation design in NB-IoT and eMTC. For example, the supported number of subcarriers for sub-PRB allocation can be single-tone, three-tone, six-tone allocation based on NB-IoT design, or can be two-tone based on Rel-15 eMTC design. In one example, the N-subcarrier allocation can be the same as NB-IoT or eMTC design, where the allocation is non-overlapped within a PRB, that is, the starting subcarrier for the N-subcarrier allocation can be the $0^{th}$, $N^{th}$, $2N^{th}$, and so forth. Alternatively, the N-subcarrier allocation can be overlapped, i.e. any subcarrier can be the starting subcarrier of the N-subcarrier allocation.

For UCI transmission, in one example, the UCI 1505 piggybacked in PUSCH is not supported for PUSCH with sub-PRB allocation. In one example, the UCI can be carried in PUCCH, and design of PUCCH can be the same as NR systems without sub-PRB allocation.

In one example of process 1400, the UCI 1505 can be carried in PUCCH and sub-PRB allocation for PUCCH can be supported. For example, the sub-PRB allocation can be supported for long PUCCH formats, e.g. PUCCH formats 1, 3, and/or 4. The PUCCH with sub-PRB allocation can be designed the same as in NB-IoT, such as based on NPUSCH format2 design. Alternatively, the PUCCH with sub-PRB allocation can be similar to the PUSCH with sub-PRB allocation, where resource units can be designed for PUCCH. For example, resource unit of eight slots for single-tone allocation, resource unit of six slots for 2-tone allocation, resource unit of four slots for 3-tone allocation, resource unit of two slots for 6-tone allocation, etc. The symbol locations for PUCCH and DMRS transmissions within one slot can follow the design in NR, such as described in Section 6.4.1.3 in TS 38.211. While symbol locations within one slot can follow NR design, one UCI transmission can spread over one or more slots within the resource unit. For DMRS design, for sub-PRB allocation with more than one subcarrier, the DMRS design can follow NB-IoT sub-PRB DMRS design, where length-N DMRS sequence can be used, with N being 3, 6 or 12, or the DMRS design can following eMTC DMRS design when two-tone allocation is configured. For the single-tone transmission if configured, the length-L DMRS sequence can be used, where L can be the number of DMRS symbols 1510 within one slot following NR design multiplied by the number of slots within one resource unit. The length-L DMRS sequence is spread in time domain on the symbols allocated for DMRS 1510 transmission across the resource unit for PUCCH transmission. FIG. 15 illustrates an example of PUCCH format 1 transmission with six-tone allocation, where two slots 1515, 1520 are assumed to be designed for one resource unit, and one resource unit is configured for the PUCCH format 1 transmission in this example. Length-6 DMRS sequence is allocated on each DMRS symbol 1510 within the resource unit.

Certain embodiments provide for an indication of the sub-PRB allocation and/or number of resource units.

In certain embodiments, when sub-PRB allocation is configured, both sub-PRB allocation and frequency resource allocation in unit of PRB can be supported. In certain embodiments, when sub-PRB allocation is configured, the resource allocation in unit of PRB can be limited. For example, when sub-PRB allocation is configured, the maximum amount of frequency domain resources to be allocated can be up to N PRB, where N can be any integers such as 1, 2, and so forth. The PRB to be allocated for sub-PRB allocation can be predefined, e.g. the $i^{th}$ PRB within the BWP, where i can be any integer such as 0, 1, 2, and so forth. Alternatively, one or more PRB to be allocated for sub-PRB allocation can be semi-statically configured, e.g. by higher layer signaling. For example, the IEs PUSCH-ServingCell-Config or PUSCH-Config can configure one or more PRBs within the BWP for the PUSCH transmission, and/or the IE ConfiguredGrantConfig can configure one or more PRBs within the BWP for sub-PRB allocation for the UL transmission without a dynamic grant. In certain embodiments, the PRB to be allocated for sub-PRB allocation can be dynamically indicated in DCI which schedules PUSCH and/or the DCI which activates the Type2 UL transmission without grant. Any combination of the above examples can be supported for the sub-PRB allocation. For example, multiple PRBs can be predefined or configured by higher layer signaling for sub-PRB allocation, and the DCI can indicate which one of the PRB and which sub-PRB allocation to be used for the PUSCH transmission.

Regarding the number of resource units to be allocated, in one example, it can be configured by higher layer signaling, such as IEs PUSCH-ServingCellConfig or PUSCH-Config. Alternatively, the number of resource units can be indicated by DCI.

In certain embodiments, indication of sub-PRB allocation and/or number of resource units in the DCI are provided according to a number of different approaches.

Certain embodiments provide an approach (Approach a) for jointly configuring with MCS index limitation.

In certain embodiments, when the MCS index limitation is configured, one or more bits in the 'Modulation and coding scheme' field can be reused for the indication of sub-PRB allocation and/or number of resource units. For example, the MSBs for indication of the sub-PRB allocation and/or number of resource units can use the 'frequency domain resource assignment' field, while the LSBs for indication of the sub-PRB allocation and/or number of resource units can use one or more bits in 'Modulation and coding scheme' field.

Certain embodiments provide an approach (Approach b) for RV field reinterpretation.

In certain embodiments, the RV is fixed or limited to certain value(s), e.g. 0, or 0 and 3. In one example, the limitation of RV is enabled when repetition is configured. When RV is limited, one or more bits in the 'Redundancy version' field can be used for the indication of the sub-PRB allocation and/or number of resource units. For example, the MSBs for indication of the sub-PRB allocation and/or number of resource units can use the 'frequency domain resource assignment' field, while the LSBs for indication of the sub-PRB allocation and/or number of resource units can use one or more bits in the 'Redundancy version' field.

Certain embodiments provide an approach (Approach c) for adding more bits.

In certain embodiments, the DCI can have additional bits for the indication of the sub-PRB allocation and/or number of resource units.

Certain embodiments provide an approach (Approach d) for reusing the frequency domain resource assignment field.

In certain embodiments, the 'frequency domain resource assignment' field in the DCI can be reinterpreted for indication of the sub-PRB allocation and/or number of resource units. For example, in embodiments in which when sub-PRB allocation is configured, the resource allocation in unit of PRB is limited, the PRB to be allocated for sub-PRB can be predefined or configured by higher layer signaling, while 'frequency domain resource assignment' indicates which set of subcarriers is allocated for the sub-PRB allocation within the predefined or configured PRB, and/or the number of resource units to be allocated for the PUSCH transmission.

Certain embodiments provide an approach (Approach e) for reusing the time domain resource assignment field In certain embodiments, the TDRA table can add one more column for the number of resource units. The 'time domain resource assignment' field can indicate the time domain resource allocation and the number of resource unit in this example. The maximum number of entries supported for the TDRA table can be extended, and one or more bits can be added to the 'time domain resource assignment' field for the indication.

The combination of any one or more of the above approaches can be supported. For example, one bit can be added to the DCI to indicate whether it is resource allocation in unit of PRB, or sub-PRB allocation, and the 'frequency domain resource assignment' field should be interpreted accordingly.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope.

What is claimed is:

1. A user equipment (UE) comprising:
a transceiver configured to communicate via a wireless communication medium with a base station; and
a processor operably coupled to the transceiver, wherein the processor is configured to:
obtain configuration information for one or more repetitions for a physical uplink shared channel (PUSCH), wherein the configuration information comprises an enable/disable indicator and a parameter to indicate a maximum number of repetitions for the one or more channels, the enable/disable indicator configured to indicate whether to enable or disable a repetition operation, and
control the transceiver to transmit or receive the one or more repetitions according to the configuration information,
wherein the configuration information comprises a redundancy version (RV) cycling pattern, and
wherein in the RV cycling pattern, each RV is repeated over N repetitions, wherein N indicated by a downlink control information (DCI).

2. The UE of claim 1, wherein the configuration information comprises at least one of:
a predefined mapping that defines the max number of repetitions associated with a configured mode, and the mode is indicated via a master information block (MIB) or a first system information block (SIB1), or another system information block (SIB); or
a configuration for a target code rate for a modulation and coding scheme (MCS) index n is $R_n/M$, and wherein $R_n$ is the code rate for the MCS index n, and
wherein M is predefined or configured.

3. The UE of claim 1, wherein the configuration information comprises a repetition pattern,
wherein the processor is configured to control the transceiver according to the repetition pattern to include a gap every L repetitions, and
wherein a gap duration or L is one of:
configurable via UE-specific signaling; or
predefined.

4. The UE of claim 3, wherein the DCI is configured to dynamically indicate one or more of:
a number of repetitions for PUSCH;
the RV cycling pattern to be used; or
the repetition pattern, and
wherein the DCI comprises: a Time domain resource allocation (TDRA) field configured to indicate a number of repetitions R, and an additional field configured to indicate a value of X, wherein the number of repetitions are indicated by R+X or R*X.

5. The UE of claim 1, wherein the processor is further configured to obtain a sub-physical resource block (PRB) configuration for sub-PRB allocation for the PUSCH or PUCCH, wherein the sub-PRB configuration is:
- cell-specific;
- UE-specific; or
- based on a predefined mapping between supported sub-PRB allocations and configured system scenario or mode, and wherein the system scenario or mode is indicated via a master information block (MIB) or a first system information block (SIB1), or another system information block (SIB).

6. The UE of claim 5, wherein a PRB to be allocated for sub-PRB allocation within a bandwidth part (BWP) can be predefined, or configured by higher layer signaling,
- wherein, for the PUCCH, the sub-PRB allocation is configured for at least one of a number of long PUCCH formats, and
- wherein a symbol allocation for UL control information (UCI) and demodulation reference signal (DMRS) within a slot follows a new radio (NR) design, while a PUCCH transmission is spread over N slots, where N depends on number of sub-carriers allocated for PUCCH transmission.

7. The UE of claim 1, wherein a frequency hopping patter is aligned with the RV cycling pattern.

8. A base station (BS) comprising:
- a transceiver configured to communicate via a wireless communication medium with a user equipment (UE); and
- a processor operably coupled to the transceiver, wherein the processor is configured to:
  - transmit, via the transceiver, configuration information for a physical uplink shared channel (PUSCH), wherein the configuration information comprises an enable/disable indicator and a parameter to indicate a maximum number of repetitions for the one or more channels, the enable/disable indicator configured to indicate whether to enable or disable a repetition operation, and
  - transmit or receive, via the transceiver, the one or more repetitions according to the configuration information,
- wherein the configuration information comprises a redundancy version (RV) cycling pattern, and
- wherein in the RV cycling pattern, each RV is repeated over N repetitions, wherein N indicated by a downlink control indicator (DCI).

9. The BS of claim 8, wherein the configuration information comprises at least one of:
- a predefined mapping that defines the max number of repetitions associated with a configured mode, and the mode is indicated via a master information block (MIB) or a first system information block (SIB1), or another system information block (SIB); or
- a configuration for a target code rate for a modulation and coding scheme (MCS) index n is $R_n/M$, and wherein $R_n$ is the code rate for MCS index n, and
- wherein M is predefined or configured.

10. The BS of claim 8, wherein the configuration information comprises a repetition pattern,
- wherein the processor is configured to control the transceiver according to the repetition pattern to include a gap every L repetitions, and
- wherein a gap duration or L is one of:
  - configurable via a cell-specific signaling or UE-specific signaling;
  - predefined; or
  - indicated by a downlink control information (DCI).

11. The BS of claim 10, wherein the DCI is configured to dynamically indicate one or more of:
- a number of repetitions for PUSCH;
- the RV cycling pattern to be used; or
- the repetition pattern, and
- wherein the DCI comprises: a Time domain resource allocation (TDRA) field configured to indicate a number of repetitions R, and an additional field configured to indicate a value of X, wherein the number of repetitions are indicated by R+X or R*X.

12. The BS of claim 8, wherein the processor is further configured to transmit, via the transceiver, a sub-physical resource block (PRB) configuration for sub-PRB allocation for the PUSCH or PUCCH, wherein the sub-PRB configuration is:
- cell-specific;
- UE-specific; or
- based on a predefined mapping between supported sub-PRB allocations and configured system scenario or mode, and
- wherein the system scenario or mode is indicated via a master information block (MIB) or a first system information block (SIB1), or another system information block (SIB).

13. The BS of claim 12, wherein a PRB to be allocated for sub-PRB allocation within a bandwidth part (BWP) can be predefined, or configured by higher layer signaling,
- wherein, for the PUCCH, the sub-PRB allocation is configured for at least one of a number of long PUCCH formats, and
- wherein a symbol allocation for UCI and DMRS within a slot follows a new radio (NR) design, while a PUCCH transmission is spread over N slots, where N depends on number of sub-carriers allocated for PUCCH transmission.

14. The BS of claim 8, wherein a frequency hopping patter is aligned with the RV cycling pattern.

15. A method comprising:
- obtaining configuration information for one or more repetitions for a physical uplink shared channel (PUSCH), wherein the configuration information comprises an enable/disable indicator and a parameter to indicate a maximum number of repetitions for the one or more channels, the enable/disable indicator configured to indicate whether to enable or disable a repetition operation; and
- transmitting or receiving the one or more repetitions according to the configuration information,
- wherein the configuration information comprises a redundancy version (RV) cycling pattern, and
- wherein in the RV cycling pattern, each RV is repeated over N repetitions, wherein N indicated by a downlink control information (DCI).

16. The method of claim 15, wherein the configuration information comprises at least one of:
- a predefined mapping that defines the max number of repetitions associated with a configured mode, and the mode is indicated via a master information block (MIB) or a first system information block (SIB1), or another system information block (SIB); or
- a configuration for a target code rate ($R_n$) for a modulation and coding scheme (MCS) index n is $R_n/M$, and wherein $R_n$ is the code rate for MCS index n, and
- wherein M is predefined or configured.

17. The method of claim 15, wherein the configuration information comprises a repetition pattern,
- wherein transmitting the one or more repetitions comprises including a gap every M repetitions,
- wherein a gap duration or M is one of:
  - configurable UE-specific signaling, or
  - predefined
- wherein the DCI is configured to dynamically indicate one or more of:
  - a number of repetitions for PUSCH;
  - the RV cycling pattern to be used; or
  - the repetition pattern, and
- wherein the DCI comprises: a Time domain resource allocation (TDRA) field configured to indicate a number of repetitions R, and an additional field configured to indicate a value of X, wherein the number of repetitions are indicated by R+X or R*X.

18. The method of claim 15, further comprising obtaining a sub-physical resource block (PRB) configuration for sub-PRB allocation for the PUSCH or PUCCH, wherein the sub-PRB configuration is:
- cell-specific;
- UE-specific; or
- based on a predefined mapping between supported sub-PRB allocations and configured system scenario or mode, and wherein the system scenario or mode is indicated via a master information block (MIB) or a first system information block (SIB1), or another system information block (SIB).

19. The method of claim 18, wherein a PRB to be allocated for sub-PRB allocation within a bandwidth part (BWP) can be predefined, or configured by higher layer signaling,
- wherein, for the PUCCH, the sub-PRB allocation is configured for at least one of a number of long PUCCH formats, and
- wherein a symbol allocation for UL control information (UCI) and demodulation reference signal (DMRS) within a slot follows a new radio (NR) design, while a PUCCH transmission is spread over N slots, where N depends on number of sub-carriers allocated for PUCCH transmission.

20. The method of claim 15, wherein a frequency hopping patter is aligned with the RV cycling pattern.

* * * * *